(12) United States Patent
Ogunsina et al.

(10) Patent No.: US 12,364,584 B2
(45) Date of Patent: Jul. 22, 2025

(54) ELECTRIC TOOTHBRUSH SYSTEM WITH PRESSURE DETECTION

(71) Applicant: PLAYBRUSH LTD, London (GB)

(72) Inventors: Tolulope Ogunsina, London (GB); Wiktor Grajkowski, London (GB); Matthäus Ittner, London (GB); Paul Varga, London (GB); Patrick Diem, London (GB)

(73) Assignee: Playbrush Ltd, London (GB)

( * ) Notice: Subject to any disclaimer, the term of this patent is extended or adjusted under 35 U.S.C. 154(b) by 392 days.

(21) Appl. No.: 17/641,040

(22) PCT Filed: Sep. 1, 2020

(86) PCT No.: PCT/GB2020/052085
§ 371 (c)(1),
(2) Date: Mar. 7, 2022

(87) PCT Pub. No.: WO2021/044129
PCT Pub. Date: Mar. 11, 2021

(65) Prior Publication Data
US 2022/0331079 A1 Oct. 20, 2022

(30) Foreign Application Priority Data
Sep. 5, 2019 (GB) .................................. 1912787

(51) Int. Cl.
*A61C 17/22* (2006.01)
*A46B 13/02* (2006.01)
(Continued)

(52) U.S. Cl.
CPC .......... *A61C 17/221* (2013.01); *A46B 13/023* (2013.01); *A46B 15/0006* (2013.01);
(Continued)

(58) Field of Classification Search
CPC .............. A46B 15/004; A46B 15/0016; A46B 15/0008; A46B 15/0006; A46B 15/00;
(Continued)

(56) References Cited

U.S. PATENT DOCUMENTS

| | | | |
|---|---|---|---|
| 2009/0044356 A1* | 2/2009 | Noble ................ | A46B 15/0008 15/207.2 |
| 2011/0010876 A1 | 1/2011 | Iwahori et al. | |

(Continued)

FOREIGN PATENT DOCUMENTS

| | | |
|---|---|---|
| WO | 2014036423 A1 | 3/2014 |
| WO | 2016180929 A1 | 11/2016 |

(Continued)

OTHER PUBLICATIONS

Corresponding International Patent Application No. PCT/GB2020/052085, International Search Report dated Oct. 29, 2020.

(Continued)

*Primary Examiner* — Tom Rodgers
(74) *Attorney, Agent, or Firm* — Cooper Legal Group LLC

(57) ABSTRACT

An electric toothbrushing device is disclosed, the device comprising means for producing vibration of a toothbrush head, means for producing an orientation signal indicating of an area of the mouth being brushed, and means for producing a pressure signal indicating a pressure applied to the toothbrush head. The device further comprises processing means arranged to link values of the orientation signal with values of the pressure signal in order to provide feedback to a user regarding a brushing pressure applied to each of a plurality of different areas of the mouth. By linking values of the orientation signal with values of the pressure signal, the user can be better informed about which parts of (Continued)

the mouth are being or have been brushed too hard. This can help the user to correct their brushing technique.

20 Claims, 14 Drawing Sheets

(51) Int. Cl.
    *A46B 15/00*         (2006.01)
    *G09B 19/00*         (2006.01)
(52) U.S. Cl.
    CPC ...... *A46B 15/0008* (2013.01); *A46B 15/0016* (2013.01); *A46B 15/0044* (2013.01); *G09B 19/0084* (2013.01)
(58) Field of Classification Search
    CPC ................ A46B 13/023; A61C 17/221; A61C 17/16–40; G09B 19/0084
    USPC .......................................................... 15/21.1
    See application file for complete search history.

(56) References Cited

U.S. PATENT DOCUMENTS

| | | | |
|---|---|---|---|
| 2012/0251975 A1* | 10/2012 | Iwahori | A61C 17/3481 |
| | | | 433/119 |
| 2014/0065588 A1 | 3/2014 | Jacobson et al. | |
| 2018/0125623 A1 | 5/2018 | Serval et al. | |
| 2019/0045916 A1 | 2/2019 | Jeanne et al. | |

FOREIGN PATENT DOCUMENTS

| | | |
|---|---|---|
| WO | 2019034854 A1 | 2/2019 |
| WO | 2019224555 A1 | 11/2019 |

OTHER PUBLICATIONS

Corresponding International Patent Application No. PCT/GB2020/052085, Written Opinion of the International Searching Authority dated Oct. 29, 2020.
Corresponding Great Britain Patent Application No. GB1912787.7, Search Report dated Jan. 30, 2020.

* cited by examiner

ELECTRIC TOOTHBRUSH SYSTEM WITH PRESSURE DETECTION

The present invention relates to an electric toothbrush, and in particular an electric toothbrush which can provide feedback to the user regarding brushing pressure.

An electric toothbrush is a toothbrush that causes vibrations of the bristles in a brush head in order to clean teeth. The vibrations may be linear or rotary, or a combination of the two. The vibrations are typically produced by a motor or a piezoelectric crystal powered by a battery. The battery may be rechargeable, and may be charged through inductive charging. Typically the brush head is removable so that it can be replaced when worn.

In use, the user moves the toothbrush through the mouth in order to brush their teeth. Depending on the type of toothbrush and the brushing technique of the user, the movement may be from tooth to tooth, and/or may involve a brushing motion similar to that of a manual toothbrush.

In order for a user to maintain good oral health it is important that they brush their teeth correctly. To help a user brush their teeth attempts have been made to monitor how the user brushes their teeth and relay this information back to the user.

Previous attempts to monitor brushing techniques have included attaching a motion sensor to a toothbrush which monitors how the user is brushing their teeth. Often, the data from the motion sensor is sent to an application (app) or computer program, which is run on an external device e.g. a mobile phone or other portable device. The app or program then provides feedback to the user about how they have brushed their teeth.

However, in current systems, the feedback provided to the user may be limited. For example, the feedback may alert the user to the fact that they are not brushing their teeth correctly but may not provide the user with information on how they may correct the deficiency. As such, it is often left up to the user to try to work out how they can improve their brushing technique. This may result in different deficiencies if the user is not sure what correction to apply.

Applying too much pressure to the teeth while brushing can abrade tooth enamel and may damage the gums. Therefore some existing electric toothbrushes include a pressure sensor. The pressure sensor is usually a switch which is activated when the force applied to the toothbrush head exceeds a certain value. When the toothbrush detects too much pressure, it may switch on a warning light on the brush handle or reduce the amount of power delivered to the brush head.

Typically, the effects on teeth and gums of too much brushing pressure are not instantaneous and may build up over time. Furthermore, some users may routinely apply too much pressure to certain areas of the mouth. It would therefore be desirable to be able to provide better feedback to the user regarding how much pressure has been applied while brushing their teeth.

According to a first aspect of the present invention there is provided an electric toothbrushing device comprising:
  means for producing vibration of a toothbrush head;
  means for producing an orientation signal indicating of an area of the mouth being brushed;
  means for producing a pressure signal indicating a pressure applied to the toothbrush head; and
  processing means arranged to link values of the orientation signal with values of the pressure signal in order to provide feedback to a user regarding a brushing pressure applied to each of a plurality of different areas of the mouth.

The present invention may provide the advantage that, by linking values of the orientation signal with values of the pressure signal, the user can be better informed about which parts of the mouth are being or have been brushed too hard. This can help the user to correct their brushing technique.

The toothbrushing device may be in the form of a toothbrush body which is attachable to a removable toothbrush head. This can allow the toothbrush head to be replaced when worn. Alternatively, it would be possible to provide the toothbrushing device with a permanently attached toothbrush head.

The vibration means may be, for example, a motor or a piezoelectric device, such as a piezoelectric crystal, or any other suitable means for producing vibration of the toothbrush head.

The device may be arranged to store linked values of the pressure signal and the orientation signal in memory. This can allow the device to log values of pressure and associated orientation over time and use them to provide feedback to the user to help them improve their brushing technique.

In one example, the toothbrushing device itself is arranged to provide feedback to the user regarding brushing pressure. Thus, the processing means may be arranged to provide feedback regarding brushing pressure based on the linked values of the pressure signal and the orientation signal. For example, the toothbrushing device may comprise a plurality of sector lights, and the processing means may be arranged to provide feedback to a user regarding a brushing pressure applied to a plurality of different areas of the mouth using the sector lights.

Alternatively or in addition, the toothbrushing device may be arranged to transmit the relevant data to an external processing device such as a mobile phone, tablet device, laptop or personal computer. In this case the external device may be arranged to provide feedback to the user regarding brushing pressure. Thus, the toothbrushing device may further comprise a transmission module, and the transmission module may be arranged to transmit the linked values of the pressure signal and the orientation signal to an external device.

The toothbrushing device may further comprise a clock for producing timing signals, and the processing means may be arranged to receive a timing signal from the clock and to link the values of the pressure signal and the orientation signal based on the timing signal. For example, the processing means may be arranged to couple together values of the pressure signal and the orientation signal which occur in the same time interval.

In one embodiment, the values of the pressure signal and the orientation signal are linked by coupling them together in discrete units. For example, the values could be coupled together in units such as "LH", "LM", "LL" etc. indicating "Left High", "Left Medium", "Left Low" for orientation and pressure within a particular time interval. Such units may be produced and stored successively over a plurality of different time intervals. The use of such units may help to minimise the amount of data that needs to be stored and/or transmitted and may help to reduce the overall amount of processing.

Alternatively or in addition the values of the pressure signal and the orientation signal may be linked by applying a time stamp to each of the values. Thus, the processing means may associate a timing value such as a time stamp with successive values of the orientation signal and the pressure signal. This can enable feedback to be provided indicating average pressure over different time periods for each area of the mouth. Furthermore, the amount of time for which too much pressure was applied can be determined and fed back to the user. In addition, the evolution of brushing pressure over time may be fed back to the user. This can help the user to correct their brushing technique.

Preferably the processing means is arranged to store the successive values of the orientation signal and the pressure signal together with their timing values in memory. This can allow post-brushing feedback to be provided to the user.

Preferably the clock is arranged to be synchronised with an external processing device. For example, the clock may be arranged to synchronise its time from an external device when it is online (for example, connected to a smartphone/tablet). Subsequent relative clock offsets may then be measured using the clock on the toothbrushing device. This can allow the toothbrushing device to correctly timestamp the values of the pressure signal and the orientation signal when the device is used offline.

The processing means may be arranged to compare values of the pressure signal with at least one pressure threshold. In this case, a value of the pressure signal may be categorized into one of two or more pressure categories in dependence on the result of the comparison. For example, the pressure may be categorized as one of "low", "medium" or "high". This may help to simplify the processing and reduce the total amount of data which is stored. The pressure thresholds may be pre-stored thresholds or may be customised for a particular user. Furthermore, different thresholds may be set for different areas of the mouth. The number of thresholds used may be, for example, 2, 3, 4, 5 or more, depending on the accuracy of the pressure detection and the level of granularity required. In some situations the pressure thresholds may be dynamically variable in dependence for example on past brushing behaviour or characteristics of the toothbrushing device such as brushing speed.

The pressure category may be stored in memory together with the value of the orientation signal. Feedback may be provided, for example, by illuminating a sector light corresponding to the value of the orientation signal with a colour corresponding to the category of the pressure. Alternatively or in addition the pressure category and value of the orientation signal may be transmitted to an external processing device which may be arranged to give feedback to the user.

Feedback may be provided on the screen of an external processing device by producing a "pressure map" indicating the average pressure which has been applied to different parts of the mouth during a predetermined period of time, such as a brushing session, part of a brushing session, or multiple brushing sessions. Alternatively or in addition, the processing means may be arranged to produce a pressure map indicating average pressure applied to different areas of the mouth over a predetermined period of time for display on the toothbrushing device itself or for transmission to an external device. It will be appreciated that these are examples only, and feedback can be provided to the user in many different ways.

The means for producing a pressure signal may comprise, for example, a switch which is activated when the pressure applied to the toothbrush head exceeds a certain value, or a pressure sensor arranged to measure the amount of pressure being applied. However, in a preferred embodiment of the invention, rather than using a pressure sensor to produce a pressure signal, the pressure signal is based on the amount of current drawn by the vibration means. This embodiment is based on the realisation that, when the toothbrush head is pressed against the teeth, the load on the vibration means changes, and this causes the current drawn by the vibration means to change.

Thus, the toothbrushing device may further comprise a battery for supplying power to the vibration means and a current sensor for sensing a current drawn from the battery by the vibration means, and the means for producing a pressure signal may be arranged to produce the pressure signal in dependence on the sensed current. By sensing the current drawn by the vibration means, an indication of the pressure applied to the toothbrush head may be obtained. This arrangement may provide the advantage that an indication of pressure can be obtained using fewer components and/or at lower cost. Furthermore, a higher level of granularity may be achievable than with a pressure switch.

The means for producing a pressure signal may be arranged to map a sensed current value to a pressure value, for example using a look-up table or a function. Alternatively or in addition, the means for producing a pressure signal may be arranged to compare a sensed current value to one or more threshold values and the pressure signal may be based on a result of the comparison.

The toothbrushing device may further comprise a voltage sensor for sensing battery voltage, and the means for producing a pressure signal may be arranged to produce the pressure signal in dependence on the sensed voltage (as well as the current). For example, the means for producing a pressure signal may be arranged to compare a sensed current value to one or more threshold values, and the one or more threshold values may be adjusted based on the sensed voltage. In this case the device may comprise a memory for storing thresholds, and the appropriate threshold may be, for example, selected based on the value of the sensed voltage. This can allow different thresholds to be set for different voltages corresponding to different states of charge of the battery, and thus may allow the thresholds to correspond more accurately to the actual pressure applied to the toothbrush head.

The various threshold values may be generic threshold values set for all devices or may be stored in advance in memory in the toothbrush device as part of a calibration process. In either case, one or more of the thresholds may be adjustable by a user. The thresholds may be calculated dynamically for a given target (requested) pressure and/or motor speed based on values of motor current, battery voltage and/or calibration data stored in memory.

The toothbrushing device may further comprise a controller for controlling the vibration means, and the controller may be arranged to adjust the vibration produced by the vibration means in dependence on the pressure signal. For example, the controller may be arranged such that, when the pressure signal is equal to or exceeds a pre-set pressure value (or some other value), the vibration is temporarily stopped or slowed down. This may be achieved, for example, by momentarily turning off the vibration means. This may provide a tactile or haptic indication to the user that they are brushing too hard and help prevent the teeth being brushed with too much pressure.

The orientation signal may be produced, for example, based on the output of a motion sensor such as an accelerometer. Thus, the device may further comprise a motion sensor for sensing motion of the toothbrushing device to produce motion data, and a signal analysis unit for analysing the motion data to produce the orientation signal. The motion data may comprise data produced by manual movement of the toothbrush by the user. The motion sensor may be an accelerometer and the motion data may be accelerometer data, although any other suitable means for producing motion data could be used instead.

The signal analysis unit may comprise means for producing, from the motion data, estimates of brushing dynamics and estimates of average acceleration, and means for producing an indication of an area of the mouth being brushed based on the estimates of brushing dynamics and the estimates of average acceleration. In this case, the signal analysis unit may further comprise:

means for performing a clustering process on the estimates of brushing dynamics and the estimates of average acceleration to produce clustering results, the clustering results comprising a plurality of clusters each of which represents a brushing area;

means for storing the clustering results; and means for comparing subsequent estimates of brushing dynamics and estimates of average acceleration with the stored clustering results, thereby to yield an indication of an area of the mouth being brushed.

The above arrangements may help to provide an accurate indication of the area of the mouth being brushed.

In any of the above arrangements, the device may comprise a memory for storing brushing parameters. The controller may be arranged to control the vibration means in accordance with brushing parameters stored in the memory. The stored brushing parameters may comprise at least one of: a timing for which each area of the mouth is to be brushed; a speed with which each area of the mouth is to be brushed; a maximum pressure with which each area of the mouth is to be brushed; maximum brushing dynamics for each area of the mouth; and total brushing time for a brushing session. At least one of the brushing parameters may be configurable by a user.

According to another aspect of the invention there is provided a toothbrush system comprising a toothbrush device in any of the forms described above, and an external processing device. The external processing device may be arranged to receive linked values of the pressure signal and the orientation signal from the toothbrush device and to provide feedback regarding brushing pressure to the user based on the linked values of the pressure signal and the orientation signal. For example, the external processing device may be arranged to display a pressure map indicating average pressure over a predetermined period of time for each of the plurality of different areas of the mouth.

Corresponding methods may also be provided. Thus, according to another aspect of the invention there is provided a method of operating an electric toothbrushing device, the method comprising:

producing vibration of a toothbrush head;

producing an orientation signal indicating of an area of the mouth being brushed;

producing a pressure signal indicating a pressure applied to the toothbrush head;

linking values of the orientation signal with values of the pressure signal; and providing feedback to a user regarding a brushing pressure applied to each of a plurality of different areas of the mouth based on linked values of the orientation and pressure signals.

Features of one aspect of the invention may be used with any other aspect. Any of the apparatus features may be provided as method features and vice versa.

In this disclosure, the term "pressure" is preferably used in its general sense to indicate a force exerted on the toothbrush head.

Preferred features of the present invention will now be described, purely by way of example, with reference to the accompanying drawings, in which.

OVERVIEW

Embodiments of the present invention relate to smart electric toothbrush device with motion detection, brushing prediction and Bluetooth Low Energy (BLE) connectivity. In addition to tooth brushing, the device can detect brushing motions, speed, directions and pressure, and provide guidance and feedback (coaching) to the user.

In a preferred embodiment, the device features a microcontroller, acceleration sensor, brushing motor and a rechargeable battery power supply. The device is charged using inductive charging. The built-in acceleration sensor is used to detect the orientation of the brush in order to estimate which part of the teeth the is user brushing. A digital low-pass filter is implemented in the acceleration sensor to filter out the acceleration due to motor vibrations.

The device operates in two distinct modes: an online mode (when it is connected via Bluetooth) and an offline mode. In online mode, acceleration data is analysed and forwarded to a mobile device. An application running on the mobile device uses this data as a control input for various types of games or teaching/coaching programs. The user is able to start/stop the brushing motor, and the device also functions as a force feedback controller, allowing the application to control the state of the motor.

On the other hand, offline mode allows the use of the toothbrush without the active connection with a mobile device. Instead, brushing motion is continually monitored and analysed. Brushing statistics and sensor data are then saved to on board non-volatile memory for later retrieval and analysis by the mobile device application.

Figure 1:
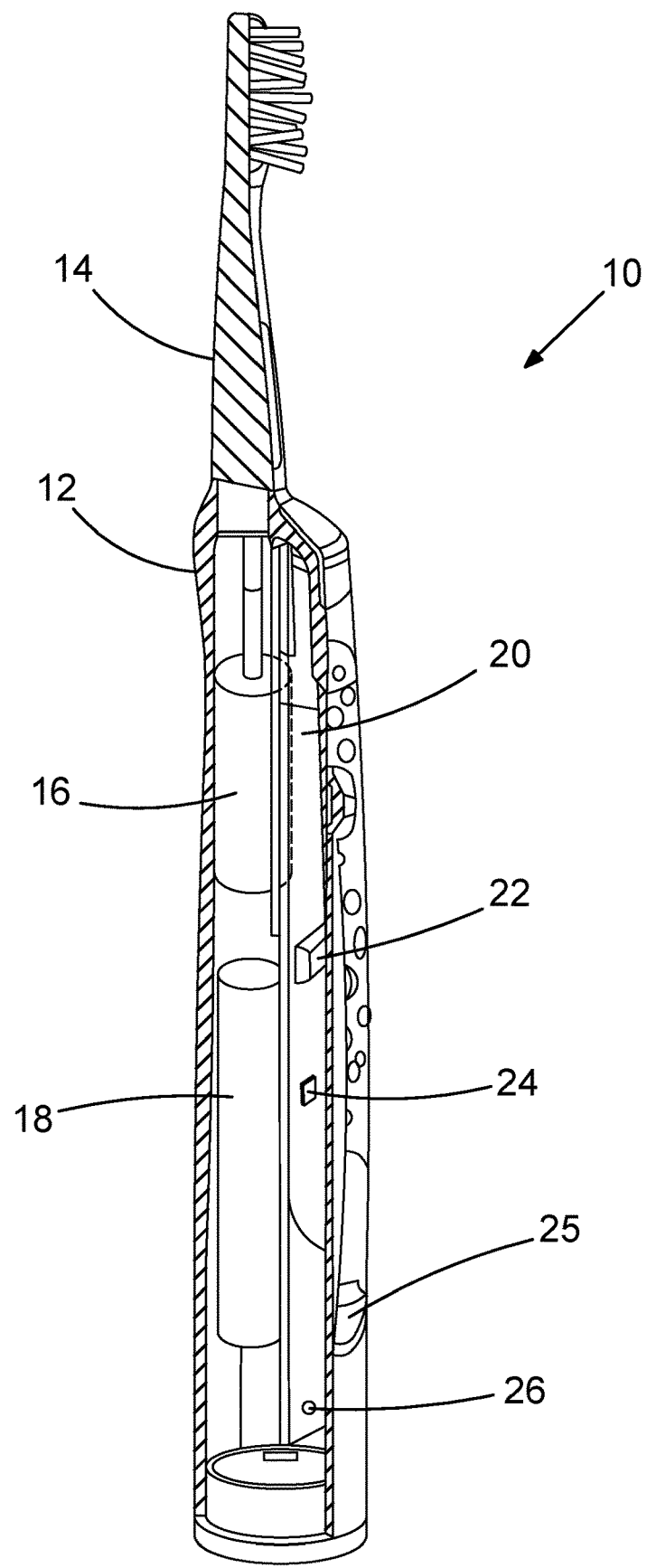
FIG. 1 shows parts of an electric toothbrush in an embodiment of the invention.

FIG. 1 shows parts of an electric toothbrush in an embodiment of the present invention. The device may be, for example, a sonic toothbrush designed to make vibrations in or above the sonic range. The toothbrush may be as described in co-pending International patent application number PCT/GB2019/051438, the subject matter of which is incorporated herein by reference.

Referring to FIG. 1, the toothbrush 10 comprises a toothbrush body 12 and a removable toothbrush head 14. The body 12 comprises a housing which accommodates a motor 16, a rechargeable battery 18, and a circuit board 20. A microcontroller/Bluetooth module 22, an acceleration sensor 24, and an RGB (red/green/blue) LED (light emitting diode) 26 are provided on the circuit board. The microcontroller module 22 is used to control the motor 16 to cause vibration of the toothbrush head 14, in order to brush the user's teeth. One or more buttons 25 are provided to turn the device on and off, and/or to adjust the settings.

Toothbrush System

Figure 2:
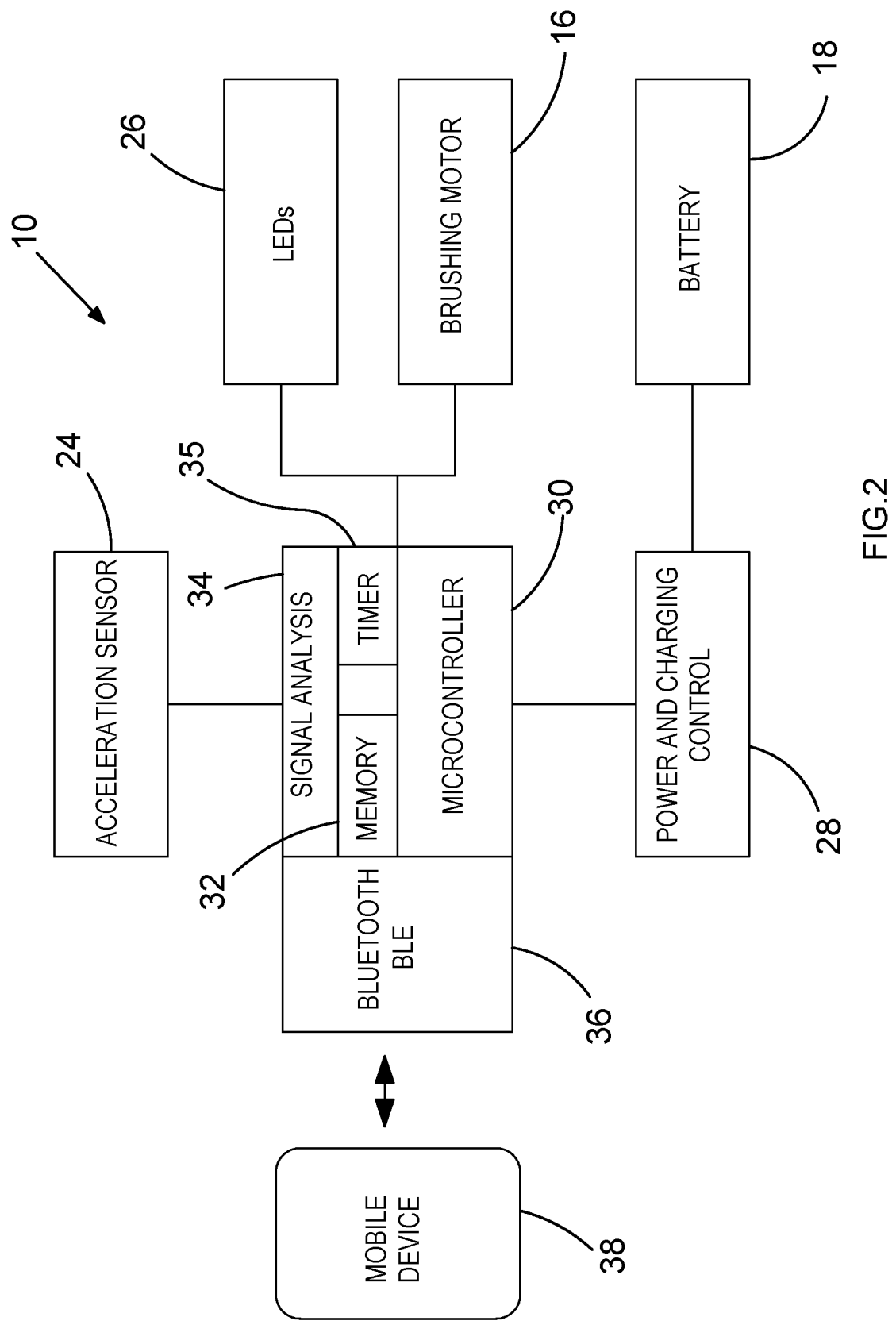
FIG. 2 is a block diagram showing key components of a toothbrush system in an embodiment of the invention.

FIG. 2 is a block diagram showing key components of a toothbrush system in an embodiment of the invention. Referring to FIG. 2, the system comprises toothbrush 10 and mobile device 38. The toothbrush 10 comprises motor 16, battery 18, acceleration sensor 24, LEDs 26, power and charging control unit 28, microcontroller 30, memory 32, signal analysis module 34, timer 35, and Bluetooth module 36. The microcontroller 30, memory 32 and signal analysis module 34 may be, for example, part of the microcontroller/Bluetooth module 22 shown in FIG. 1. The Bluetooth module 36 communicates with the mobile device 38. The mobile device 38 may be, for example, a mobile phone, a tablet computer, a laptop computer, a smart watch, or any other suitable processing device. An application running on the mobile device is used to provide feedback to the user and/or to control the toothbrush when the toothbrush is online. Although a Bluetooth low energy module is shown in FIG. 2, any other low power wireless transmission protocol, such as ZigBee, LoRa or WiFi could be used instead.

In operation, the battery 18 supplies power to the brushing motor 16, under control of the power and charging control module 28 and the microcontroller 30.

The microcontroller 30 executes program code in order to control operation of the toothbrush. The memory 32 stores brushing parameters which are used by the microcontroller to perform the appropriate brushing operations, as well as other data such as brushing statistics and sensor data.

As the user brushes their teeth, the acceleration sensor 24 collects acceleration data caused by movement of the toothbrush. The signal analysis module 34 performs signal processing on the acceleration data, in order to provide feedback to the user regarding how they are brushing their teeth, and to allow control of the vibration of the toothbrush head. The timer 35 is used to time the brushing session.

Figure 3:
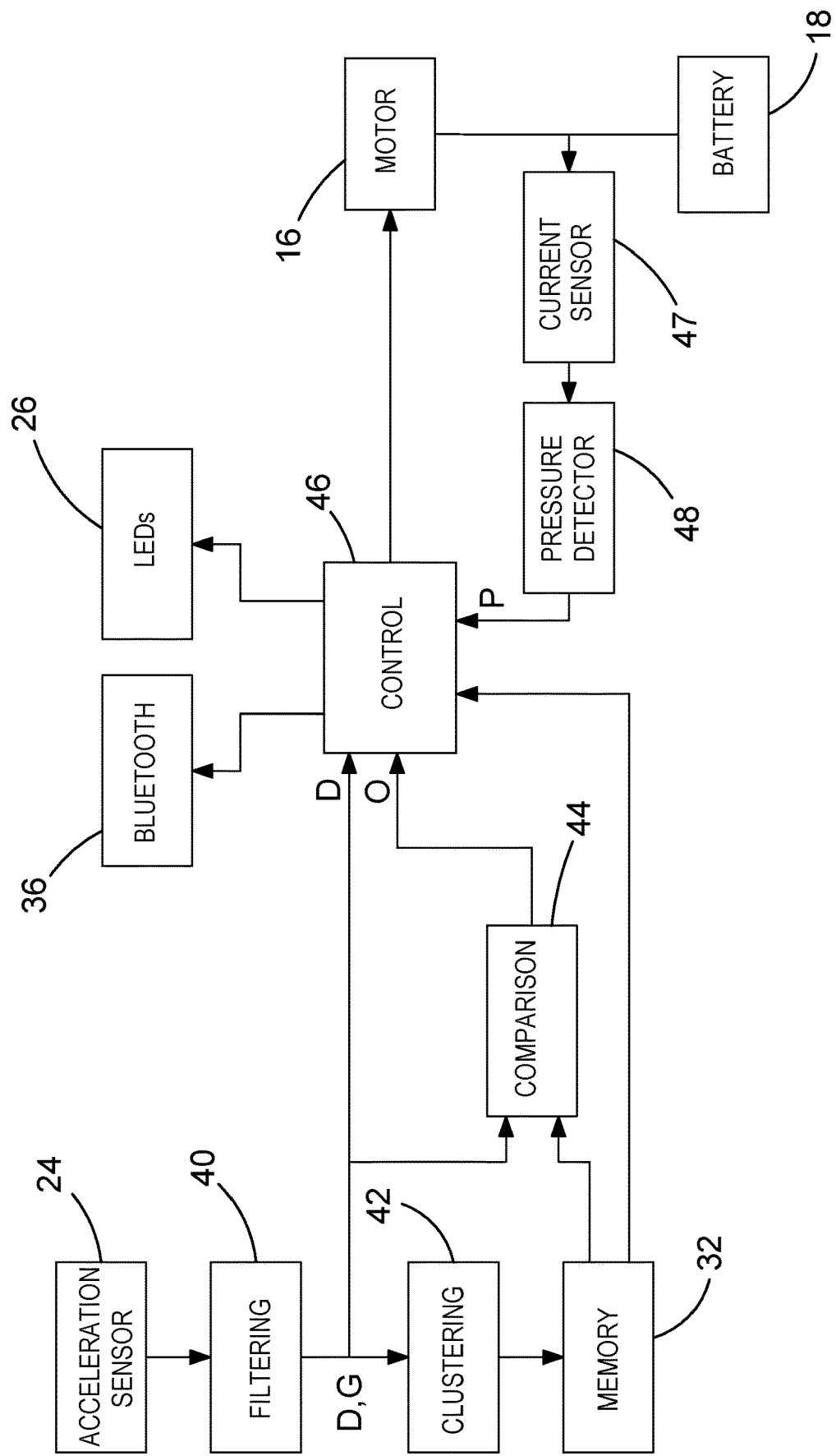
FIG. 3 shows in more detail parts of the toothbrush device which are used for feedback and control.

FIG. 3 shows in more detail parts of the toothbrush device which are used for feedback and control. Referring to FIG. 3, the device comprises acceleration sensor 24, filtering module 40, clustering module 42, memory 32, comparison module 44, control module 46, current sensor 47 and pressure detector 48 as well as Bluetooth module 36, LEDs 26, motor 16 and battery 18.

In operation, the acceleration sensor 24 collects acceleration data caused by movement of the toothbrush. The acceleration data is passed to filtering module 40. The filtering module 40 filters the acceleration data to provide an estimate of the brushing dynamics D, and a moving average value of the acceleration G, as will be explained below. The output of the filtering module 40 is fed to clustering module 42. The clustering module 42 performs a clustering process on the data received from the filtering module 40. The clustering module 42 produces clustering results which are passed to the memory 32 for storage.

The filtering module 40 and the memory 32 are both connected to comparison module 44. The comparison module 44 receives the brushing dynamics D and the moving average value of the acceleration G from the filtering module 40, and stored clustering results from the memory 32. The comparison module 44 compares the data from the filtering module 40 with the clustering results from the memory 32. The result of the comparison is an orientation signal O, which provides an indication of which area of the mouth the user is brushing. The comparison module 44 passes the orientation signal to control module 46. The control module 46 is able to control the speed of the motor 16 based on the orientation signal O. The control module 46 also provides feedback to the user, based on the orientation signal. This may be done by controlling the speed of the motor 16, controlling the LEDs 26, and/or sending a signal to the mobile device 38 via the Bluetooth module 36.

The control module 46 also receives the estimate of the brushing dynamics D from the filtering module 40. The control module 46 is also able to provide feedback and control based on the value of the brushing dynamics D.

The battery 18 supplies current to the motor 16, in order to produce vibration of the toothbrush head. The amount of current drawn by the motor 16 from the battery 18 is measured by current sensor 47. The sensed current is passed to pressure detector 48. The pressure detector 48 produces a pressure signal P based on the sensed current. The pressure signal P may also be used by the control module 46 to control vibration of the toothbrush head and/or provide feedback to the user.

Operation of the various modules shown in FIG. 3 is described in more detail below.

Filtering Module

In the filtering module 40, the data from the acceleration sensor 24 is first passed through a low-pass filter to remove vibration motions (which are at a higher frequency). The thus produced sensor data is then scaled to correct amplitude. The sensor data is then passed through three filters. One signal branch produces an estimate of the brushing dynamics D, while the second branch produces a moving average value of the acceleration G. Each component of the original measurement (in x, y and z axes) is filtered separately. The final scalar value of the dynamics estimation is produced by calculating the dynamics estimation vector length. These signals are then provided to a subsequent clustering process performed by clustering module 42.

Figure 4:
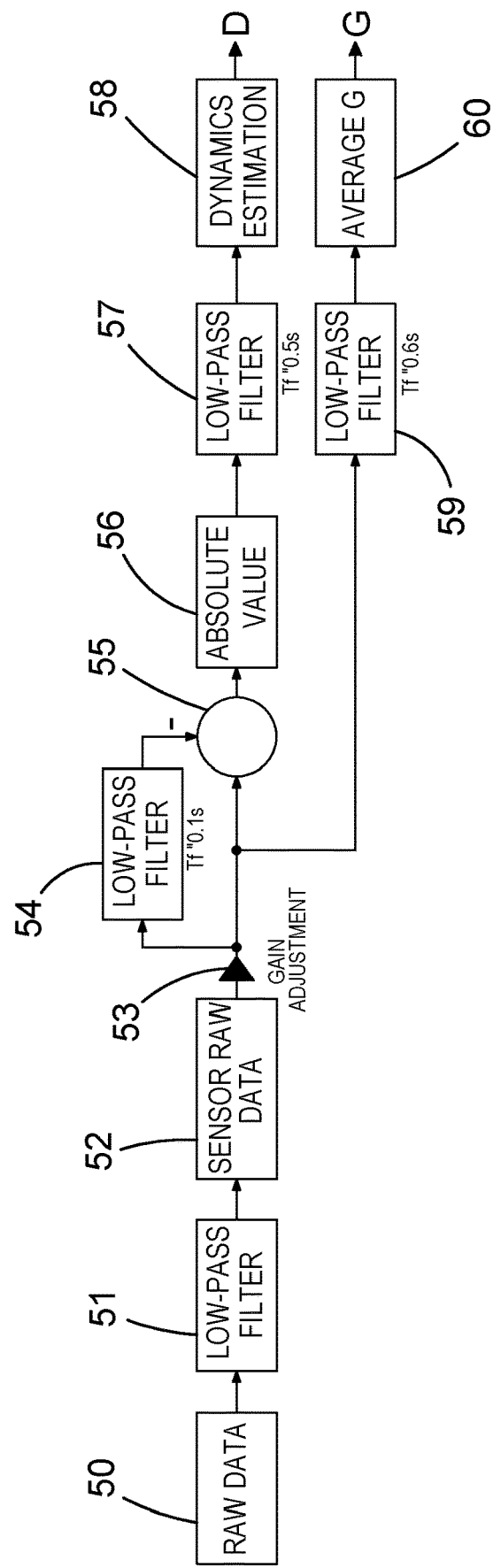
FIG. 4 illustrates the filtering process performed by the filtering module of FIG. 3.

FIG. 4 illustrates the filtering process performed by the filtering module 40. Referring to FIG. 4, raw acceleration data 50 from the acceleration sensor are passed through low pass filter 51. The cut-off frequency of the filter 51 is such that components of the acceleration data caused by manual movement of the toothbrush are passed, while high frequency components of the acceleration data caused by vibration of the toothbrush are removed. Thus the output of the low-pass filter 51 is raw sensor data 52 containing acceleration due to manual movement of the toothbrush as well as acceleration due to gravity. The raw sensor data 52 are then scaled by amplifier 53 to the correct amplitude. The scaled sensor data are then divided into two branches.

In a first branch, the sensor data are passed through low pass filter 54. The cut-off frequency of the low pass filter 54 is such that acceleration due to gravity is passed, while acceleration due to manual movement of the toothbrush is not. The thus filtered data is then subtracted from the sensor data in subtractor 55. Thus, this operation removes acceleration due to gravity from the sensor data, leaving a linear acceleration component. The x, y and z components of the raw sensor data 52 are filtered separately.

The filtered x, y and z components are then passed to absolute value calculation module 56. The absolute value calculation module 56 calculates the absolute value of the linear acceleration from the square root of the sum of the squares of the x, y, and z components.

The absolute value of the linear acceleration data is then passed to a low-pass filter 57. The cut-off frequency of the low-pass filter 57 is set such that it passes the linear acceleration data, but removes higher frequency data. Thus, the low-pass filter 57 is used to reduce noise present in the data. The filtered absolute value of the linear acceleration data is passed to the dynamics estimation module 58. The dynamics estimation module 58 calculates the averaged magnitude (vector length) of the linear acceleration data to produce an estimation of the brushing dynamics D. The estimate of brushing dynamics D provides an indication of how strong or fast or vigorously the user is brushing their teeth.

In a second branch of the filtering process, the sensor data are passed through low pass filter 59. The cut-off frequency of the low pass filter 59 is such that it passes the gravity component of the raw sensor data 52, but not the acceleration component due to manual movement. The x, y, and z components of the raw sensor data 52 are filtered separately to yield separate x, y and z gravitational components. The gravitational filtered data is used to provide an average value of the acceleration G. The average value of acceleration G is calculated in averaging module 60 by averaging the filtered gravitational acceleration data in the x, y, and z directions.

Thus, the filtering process carried out by the filtering module 40 includes the process of passing the sensor data through filters and calculating the brushing dynamics D and the average acceleration G. The top path produces the brushing dynamics estimation (by subtracting gravity hence obtaining just linear acceleration, taking the absolute value of it and averaging to smooth it out). The bottom path produces gravitational data gravity by low pass filtering raw acceleration data. The filtered gravitational data and the dynamics estimation are passed onto the clustering module 42 for further processing.

Clustering Module

The clustering module 42 performs a clustering process on the filtered gravitational data G and the dynamics estimation D received from the filtering module 40. The clustering process produces clustering results which can be compared with subsequent acceleration data to indicate which area of the mouth the user is brushing at any given time.

The clustering module 42 performs a clustering algorithm that uses cosine distance for the cluster similarity measure instead of Euclidean distance. The angular coordinate is calculated from x and y projections of the average value of the filtered gravitational data G, while the radial component is the scalar value of the dynamics estimation D. Five clusters can be identified in the modified space represented with polar coordinates: one central cluster indicating brushing inactivity and four clusters on a ring around it. These four clusters represent the four brushing sides (top, left, right, bottom).

The clustering module 42 only performs the clustering process if it is determined that the motion data relates to brushing, rather than any other form of motion. This determination is made by comparing the value of the brushing dynamics D with maximum and minimum acceleration thresholds. If the value of the brushing dynamics D falls below the minimum acceleration threshold, it is determined that the device is not being used for brushing and so the clustering process is not performed. If the value of the brushing dynamics D exceeds the maximum acceleration threshold, it is determined that the motion is not valid, in which case the clustering process is also not performed.

In the clustering module 42, the filtered acceleration data related to brushing motion is first projected onto a cylindrical coordinate reference system. To do this, the angular coordinate is first calculated from the x and y components of the average acceleration G output from the low-pass filter 59. The radial component is the value of the dynamics estimation D. The clustering algorithm is then run on the data points.

The clustering algorithm organises similar data points into clusters. Each cluster therefore comprises data points that are similar to each other in some way and are dissimilar to data points belonging to other clusters. In this case, the clustering algorithm uses distance-based clustering. This means that two or more data points are determined to be similar if they are close together in distance. The clustering algorithm uses cosine distance for measuring the cluster similarity instead of Euclidean distance.

Each cluster is representative of a particular region of the mouth. Thus, the clusters represent a convenient way of mapping the acceleration data onto a representation of the user's mouth.

For the clustering process to work, the clusters need to be defined and associated with a particular region of the user's mouth. This is done by initially pre-loading the clustering module 42 with standard acceleration data from laboratory tests. A list of regions of the mouth for which the device should be providing feedback is then identified. The toothbrush device is then placed in a particular region of the mouth and the clusters are defined by seeing which area of the mouth the pre-loaded acceleration data corresponds to.

The clustering algorithm uses a distance threshold above which data is determined to be dissimilar to a particular data point, and below which data is determined to be similar to a particular data point and so in the same cluster. These thresholds are preprogramed into the clustering module when the device is initially set-up so that the clustering algorithm will work, even if it is the first time the user has used the device.

When the user uses the toothbrush they brush their teeth and generate their own acceleration data. The user's acceleration data (the gravitational data G and the dynamics estimation D) are then compared to the pre-defined clusters to see which area of the mouth the user's acceleration data corresponds to. G is used to determine direction and D is used to determine magnitude. The result of the comparison is the area of the mouth that the device has determined the user is brushing.

The user's acceleration data from a particular brushing session is combined with the pre-stored acceleration data already stored on the device. As the user uses the device they will generate more acceleration data which is combined with the pre-stored data. Once there is sufficient user specific acceleration data present, the clustering algorithm is run on the user specific data to generate user specific clustering results, instead of relying on the pre-defined clusters. Therefore, over time, the user's acceleration data replaces the pre-stored acceleration data and the user's clustering results replace the pre-determined clustering results. The clustering results generated using the user specific acceleration data provide a more accurate mapping between the acceleration data and the user's mouth. This allows more accurate feedback to be provided to the user.

Over time, clustering parameters used in the clustering process are updated and made more specific to an individual user. This happens when the toothbrush device is online to an external device. The Bluetooth module 36 uses a Bluetooth connection to transfer the clustering data to the external device. The main parameter to be updated will be the cluster thresholds which are used to determine which cluster the acceleration data belongs to and consequently which region of the user's mouth is being brushed. As the user uses the device, the device will collect and store more data corresponding to more brushing sessions.

This data can be sent to the external device which analyses the historical data and updates the clustering thresholds if it is found that they are inappropriate (for example, too stringent or lenient) for a particular user.

For example, if a user is very consistent with their brushing technique and has well defined brushing motions for each area of the mouth, the difference between the user's maximum and minimum motions for each region of the mouth is small. This means that a user's brushing data forms small, well-defined clusters whose data points are close together. In this case, the distance threshold used by the clustering algorithm and coaching function for each cluster may be made smaller. That is, points are only considered as part of the same cluster if they are closely grouped together. The limit at which data points are not considered part of the same cluster has been reduced.

On the other hand, a user with a more erratic style of brushing has a greater difference between their maximum and minimum brushing motions for each region of the mouth. This means that a user's brushing data forms large clusters with fuzzy edges, i.e. the limit of each cluster is not well defined. The data points in each cluster are spread out. This means that the distance threshold used by the clustering algorithm and coaching function for each cluster needs to be larger to take into account the variation in data points. The limit at which data points are not considered part of the same cluster is larger and so the boundaries of neighbouring clusters may be quite close together.

The clustering thresholds therefore take into account different brushing styles. By updating the clustering thresholds, the device is able to provide tailor the clustering process to each individual user.

Figure 5:
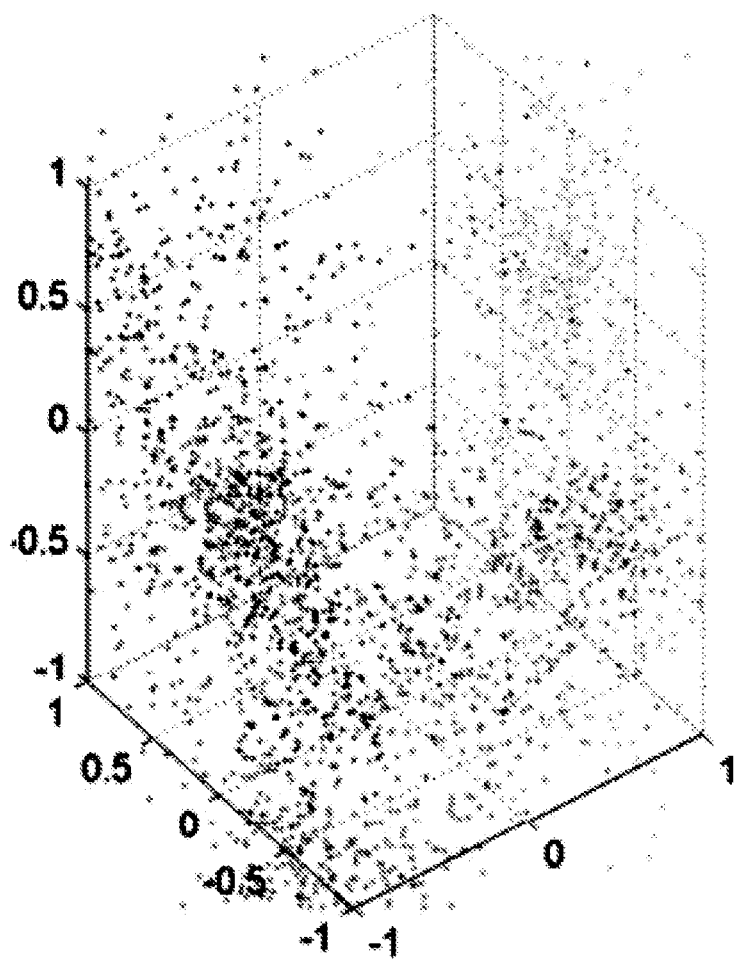
FIG. 5 shows data before a clustering process.
Figure 6:
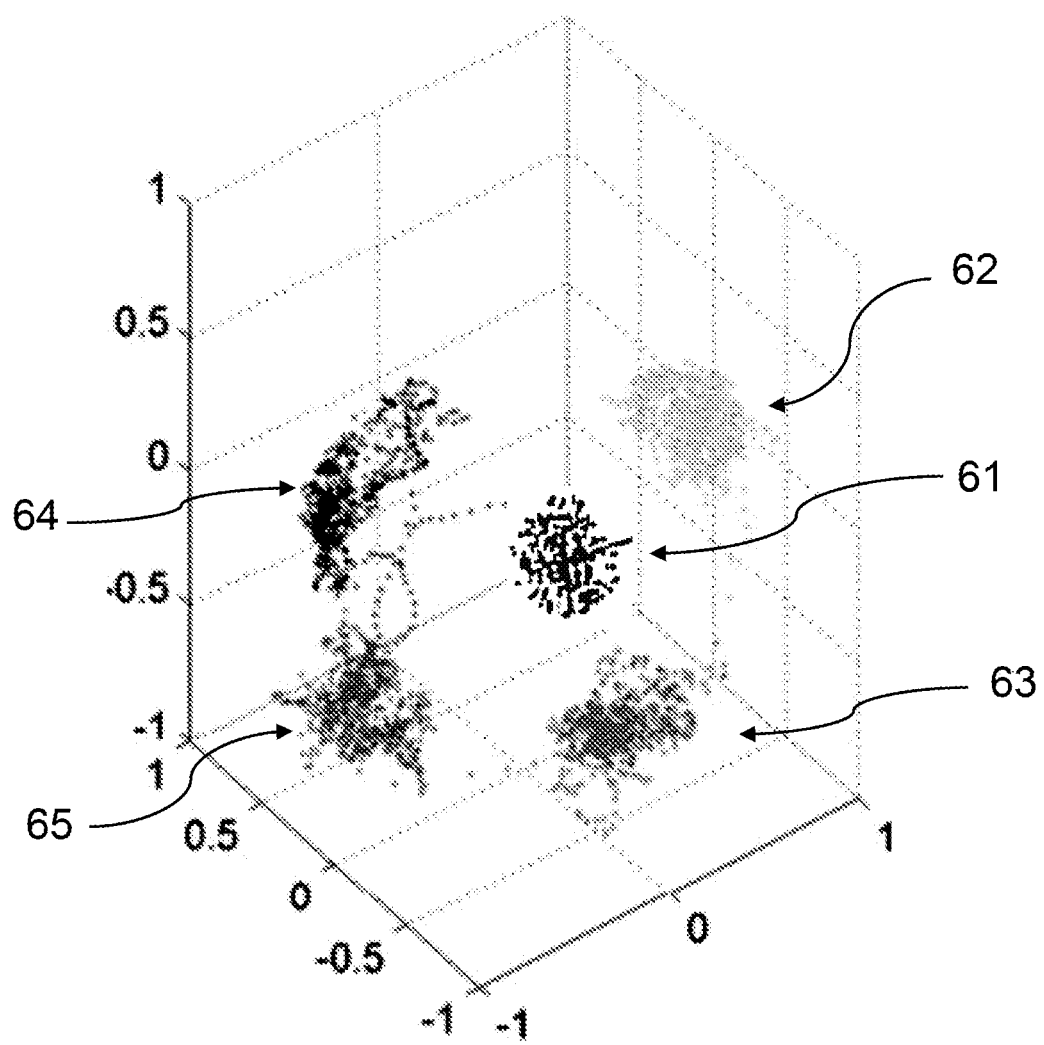
FIG. 6 shows the data after the clustering process.

FIG. 5 shows the raw data before the clustering process, and FIG. 6 shows the data after the clustering process. Referring to FIG. 6, the clustering process results in five clusters. The central cluster 61 represents no brushing activity. The four other clusters 62, 63, 64, 65 are positioned around the central cluster 61. The four clusters 62, 63, 64, 65 represent the four main areas of the mouth that will be brushed by the user. These four areas are inner top, inner bottom, outer left, and outer right.

Comparison Module

The comparison module 44 compares the data from the filtering module 40 with the clustering results from the memory 32. The result of the comparison is an orientation signal O, which provides an indication of which area of the mouth the user is brushing.

The comparison process uses dynamic clustering to indicate the region of the mouth that is being brushed. This means that the comparison process uses the current acceleration data, as well as the previous result of the comparison process to determine which area of the mouth the user is brushing. The device is therefore able to predict which area of the mouth is being brushed when it receives data which are equidistant from two clusters. This works because, typically, a user will brush adjacent areas of the mouth when brushing their teeth rather than move around the mouth in a disjointed, random manner. For example, if current acceleration data is equidistant between two clusters, each cluster representing the outer right region and inner top region, but the previous comparison result indicated that the user was brushing the outer left region of the mouth, it is highly likely that the current data corresponds to brushing the outer right region of the mouth. This is because a user is more likely to have moved from the outer left part of the mouth to the outer right part of the mouth than to have moved from the outer left to the inner top. On the other hand, if the data is equidistant from two clusters (for example, outer left and outer right) and the previous comparison indicated one of those two clusters (for example outer left), then it is assumed that the user did not change the direction and that the correct cluster is still the previous cluster (in this example, outer left).

In an alternative arrangement, at each stage of the comparison process the previous cluster gets a slight 'bonus' or preference by decreasing its cosine distance by a constant parameter (for example, 0.3, 0.4, 0.5 or some other value). Therefore, in this arrangement, the data point has to be closer to the 'main mass' of the cluster for the cluster to change.

The filtering module, clustering module and/or comparison module described above may be part of the signal analysis module 34 shown in FIG. 2, and may be, for example, as described in International patent application WO2019/034854 in the name of the present applicant, the subject matter of which is incorporated herein by reference.

Pressure Detection

The device can measure the pressure applied by the user by detecting the current that is drawn by the motor when the user is brushing. The motor current serves as an indirect pressure indicator. When a user changes the pressure by pressing the toothbrush head against the teeth, the load on the motor is changed, and this causes the amount of current which it draws to change. The motor current being drawn is compared against thresholds to determine the pressure being applied by the user. Feedback is given to the user either via an external device (like a smartphone) or directly on the device via LED or vibration motion.

Figure 7:
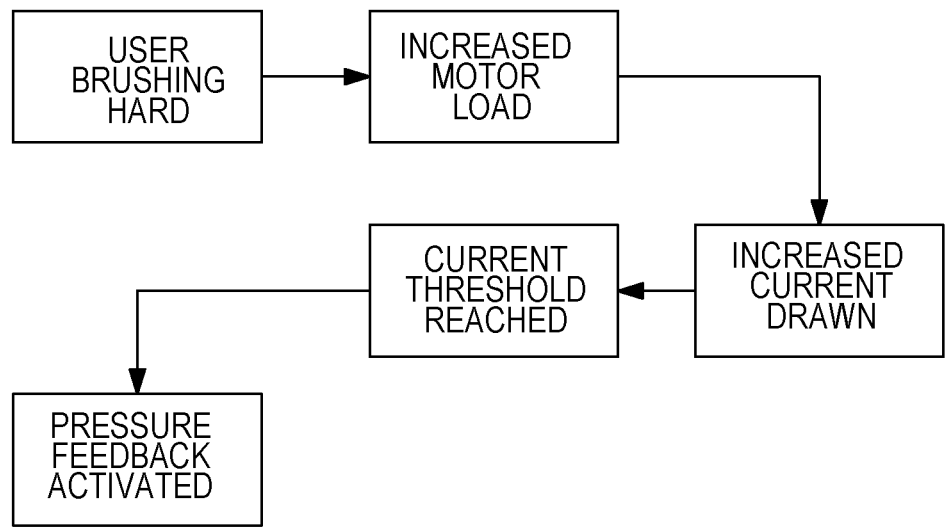
FIG. 7 shows an example of a pressure detection process.

An example of the pressure detection process is illustrated in FIG. 7 and is explained in more detail below.

Referring back to FIG. 3, in a preferred embodiment of the invention the toothbrush device is provided with a current sensor 47 and a pressure detector 48. In operation, the amount of current drawn by the motor 16 from the battery 18 while the user is brushing their teeth is detected by current sensor 47. The sensed current is fed to pressure detector 48. The pressure detector 48 compares the motor current against pre-set thresholds to determine the pressure being applied by the user. A signal P indicating pressure is fed to the control module 46. The pressure signal P may be used by the control module 46 to control vibration of the toothbrush head.

The pressure detector 48 may compare the current signal to a threshold value. In this case the pressure signal P is an indication that the pressure is above a certain value. The threshold value is initially a value which has been pre-set in the device. However the threshold value may be adapted by the user, for example using an app on their mobile device. Furthermore, different threshold values may be set, for example for different users and/or for different parts of the mouth. If desired, a plurality of different thresholds may be set, in which case the pressure signal P may indicate a plurality of different pressures, for example, low, moderate or high pressure.

Since the amount of current drawn may depend on motor speed, different thresholds may be used for different motor speeds. Furthermore, the thresholds may be adapted depending on the state of charge of the battery, to take into account the fact that the battery may be partially drained and thus not able to supply full power. This may be detected by monitoring average current over time, or current drawn when it is determined that no brushing is taking place, or the battery voltage, or some combination thereof.

Alternatively, or in addition, the pressure detector 48 may map the current value to a pressure value, for example using a look-up table or a predefined function. In this case the pressure signal P may be a value indicating how much pressure is being applied. The function or the look-up table may be adapted depending on motor speed and/or the state of charge of the battery.

An advantage of using current to determine the pressure is that it is less expensive and requires fewer components in comparison to conventional pressure sensing devices. Furthermore, a greater degree of granularity may be possible, which may improve the feedback provided to the user.

As mentioned above, the pressure detector 48 may compare the current signal to a threshold value and output a pressure signal P if the threshold is exceeded. The threshold value may be a value which has been pre-set in the device. For example, in one embodiment, the pre-set threshold value may be the same for all toothbrush devices. However, it has been found that the relationship between current and pressure may vary between individual toothbrush devices. Therefore, in another embodiment, each toothbrush is calibrated such that the threshold value reflects the relationship between current and pressure for that particular toothbrush. In this case, the calibration process may store the appropriate threshold value or values in a memory on the toothbrush device. This can allow each toothbrush to produce the pressure signal P in response to approximately the same pressure being applied.

Since the amount of current drawn may also depend on the state of charge of the battery, the calibration process may also set different thresholds for different states of charge of the battery, as determined by the battery voltage. The various thresholds may be stored in memory in the toothbrush. In this case, the pressure detector may look up the appropriate threshold based on the state of charge of the battery, compare that threshold to the current signal, and output a pressure signal P if the threshold is exceeded. If desired, a plurality of thresholds may be set representing different pressure values.

Figure 8:
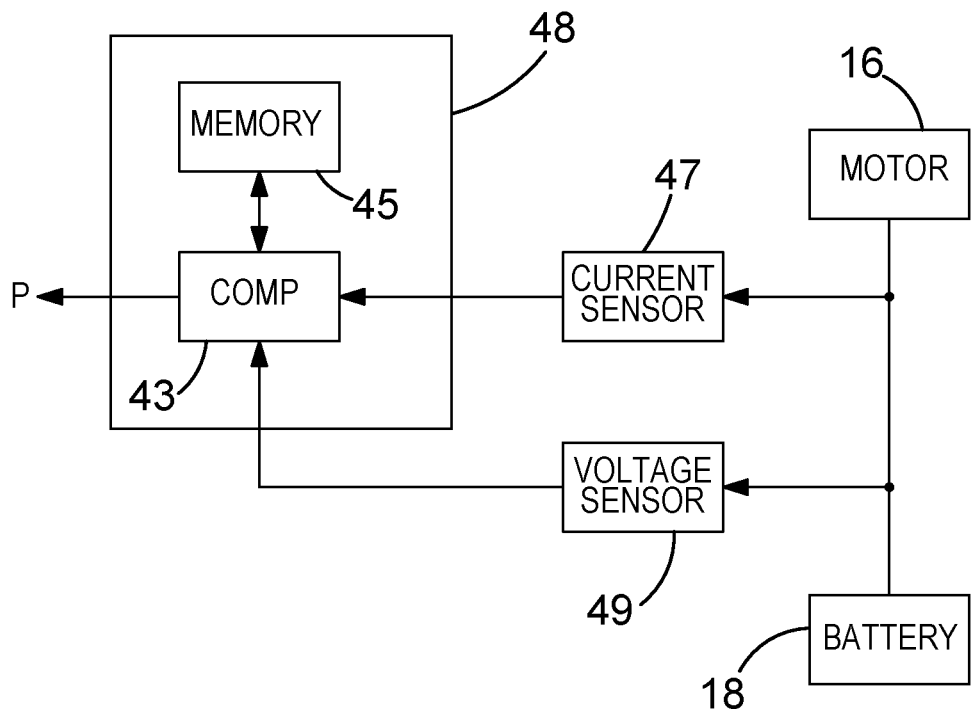
FIG. 8 shows parts of a toothbrush device in an embodiment of the invention.

FIG. 8 shows parts of a toothbrush device in an embodiment of the invention. Referring to FIG. 8, in this embodiment the toothbrush device comprises motor 16 and battery 18 which may be the same as the corresponding parts described above. The device also comprises current sensor 47 and voltage sensor 49, as well as comparison module 43 and memory 45 which are part of pressure detector 48.

In operation, the voltage of the battery 18 is measured using voltage sensor 49. The measured voltage is fed to the comparison module 43. The amount of current drawn by the motor 16 from the battery 18 is detected by current sensor 47 and fed to comparison module 43. The comparison module 43 reads a threshold value (or values) from the memory 45 based on the measured value of the battery voltage. The comparison module 43 then compares the threshold value (or values) read from the memory 45 with the sensed value of the current from the current sensor 47. If the threshold is exceeded, the comparison module outputs a pressure signal P. The pressure signal P is fed to the control module 46 shown in FIG. 3 and/or other parts of the device.

In another embodiment of the invention the threshold value for the motor current is recalculated dynamically (as opposed to being fetched from memory/lookup table based on state) for a given target (requested) pressure (force) and motor speed based on present values of motor current and battery voltage and on calibration data stored in memory. Tests have shown that all relationships can be approximated by linear functions and hence calibration data can be scaled according to motor speed, target threshold pressure (force) and battery voltage.

Figure 9:
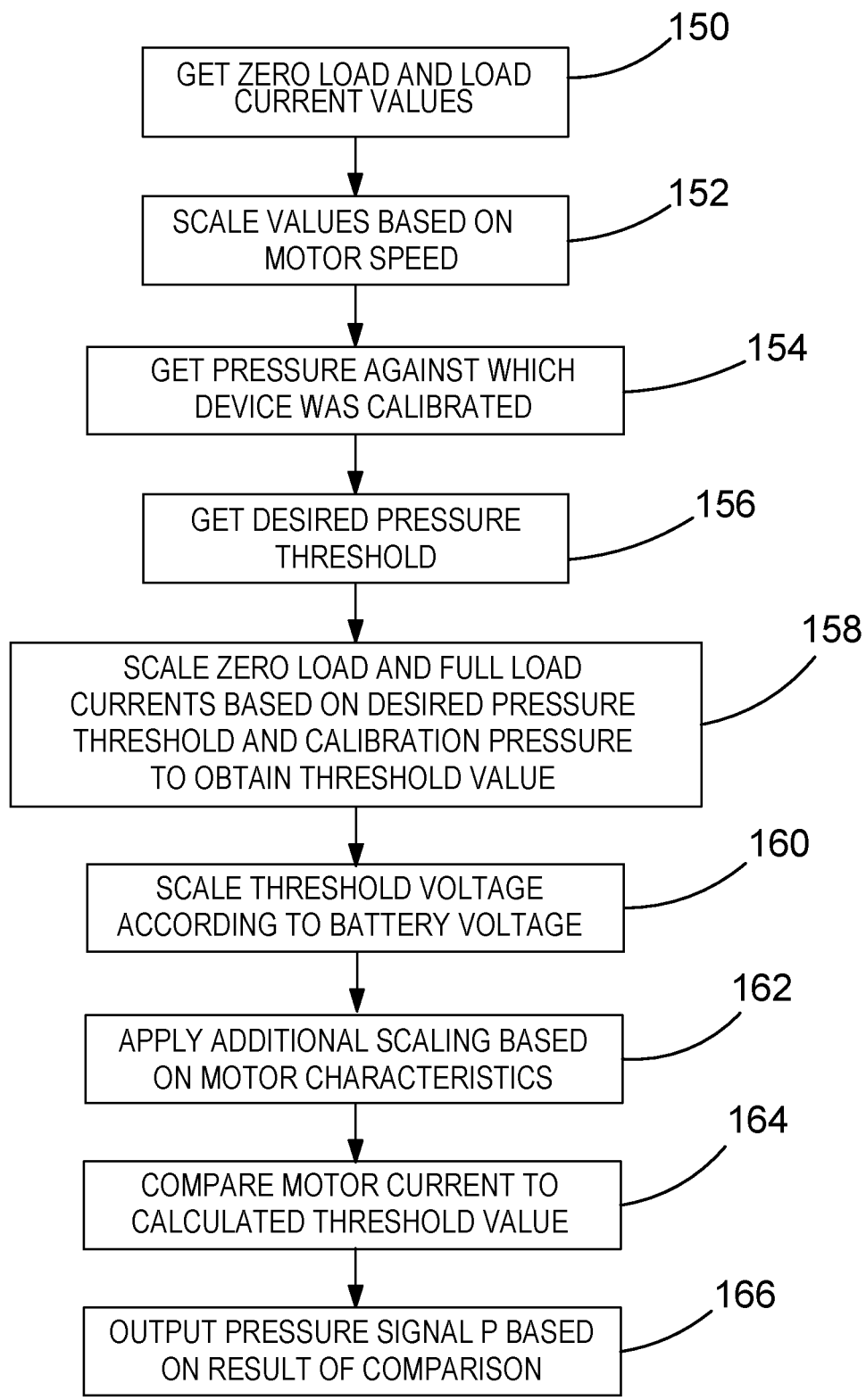
FIG. 9 shows steps taken in a pressure detection process in one embodiment of the invention.

FIG. 9 shows the steps taken in a pressure detection process in one embodiment of the invention. These steps may be carried out by a pressure detection module running as software on a processor such as microcontroller 30 in FIG. 2.

Referring to FIG. 9, in step 150 a zero-load current value and a load current value are read from calibration data stored in memory. These values are values which are stored in advance in the device as part of a calibration process. The zero-load current value is the current value when no pressure is applied to the toothbrush head, and the load current value is the current value when a predetermined pressure is applied to the toothbrush head. In both cases, the current values correspond to the case where the motor is at full speed (100% duty cycle).

In step 152, the zero-load current value and the load current value are scaled according to the motor duty cycle (speed) using a predetermined relationship (e.g. linear function) stored in memory. The motor duty cycle may be obtained for example from the control module 46 in FIG. 3. In step 154, the pressure (force) against which the device was calibrated is read from memory. In step 156 the desired threshold pressure is obtained, for example, from the control module 46 shown in FIG. 3 or from a pressure feedback module (see below). The desired threshold pressure is the pressure against which it is desired to compare the actual pressure, and this may vary depending on, for example, the user and the area of the mouth being brushed. In step 158 the threshold current value is defined by scaling the zero-load and load current values based on the desired pressure threshold and the calibration pressure. This is done using predetermined relationships (e.g. linear functions) stored in memory. In step 160 the threshold current is scaled according to the battery voltage (as measured by the voltage sensor) using a predetermined relationship (e.g. linear function) stored in memory. In step 162 additional scaling is applied depending on motor characteristics (motor speed and calibration data) using a predetermined relationship stored in memory. This allows variations in motor characteristics to be taken into account. In step 164 the computed current threshold value is compared to the actual motor current value. In step 166 a result of the comparison is output as pressure signal P, for example to control module 46 in FIG. 3.

The above arrangements can allow the threshold values to be calibrated for each toothbrush and adapted in dependence on the state of charge of the battery. This may allow the thresholds to correspond more closely to the actual pressure being applied. Each comparison may be with a single threshold, or with a plurality of different thresholds.

Set Up

When the toothbrush device is first used, it will typically have default brushing parameters pre-installed. These parameters may include brushing speed and brushing timings. For example, a default setting may be to brush each quadrant for 30 seconds at normal speed. These parameters are stored in the memory 32, and accessed by the control unit 46 to control the motor 16.

At any stage, the user may set the brushing parameters using an application installed on a mobile device or any other suitable processing device such as a computer. The process of setting the brushing parameters is illustrated in FIG. 10.

Figure 10:
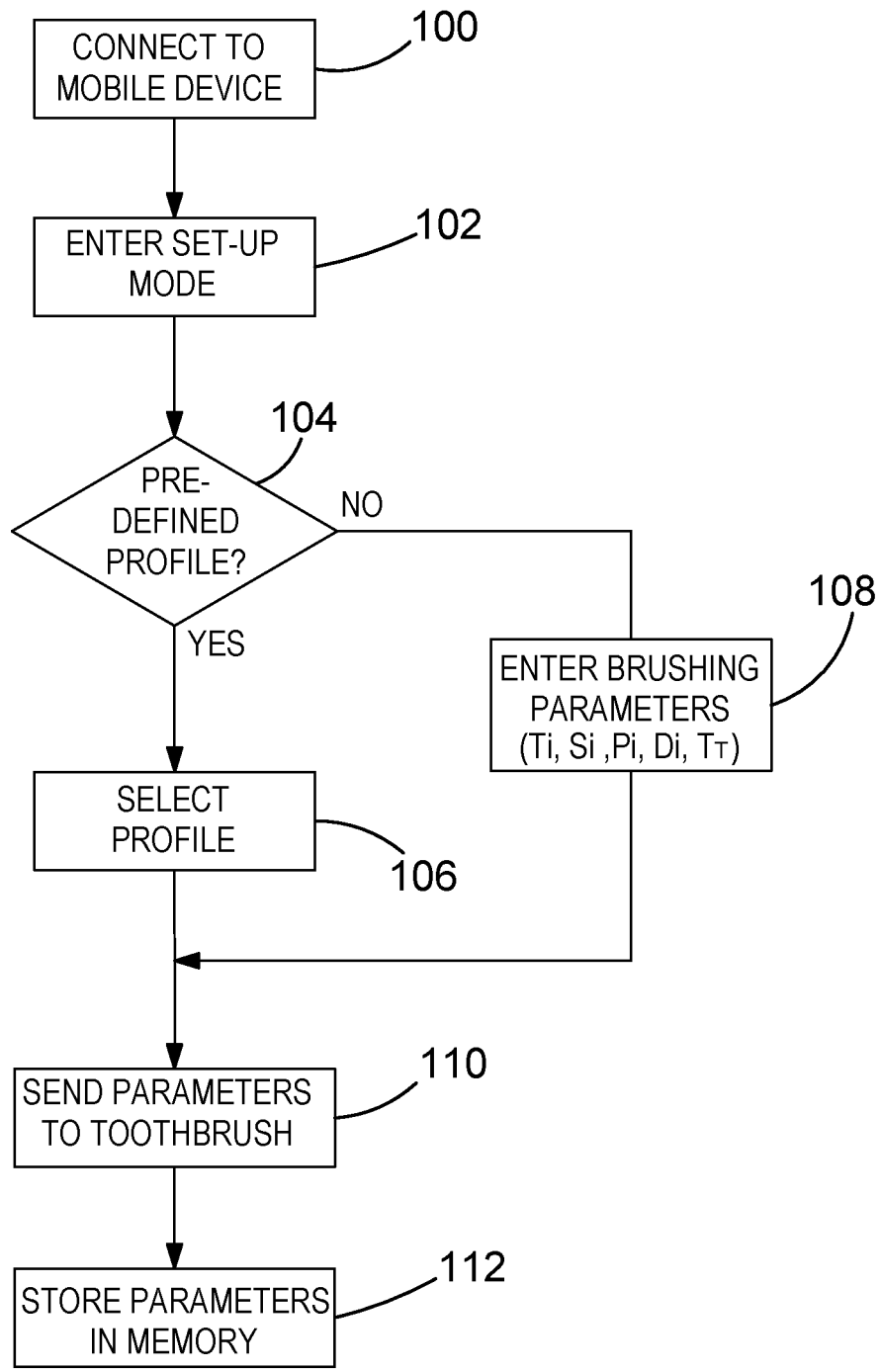
FIG. 10 shows a process of setting the brushing parameters.

Referring to FIG. 10, in step 100 the toothbrush device is connected to a mobile device or other processing device. In step 102 an application running on the mobile device enters set-up mode. In step 104 it is determined whether the user wishes to use a pre-defined brushing profile, or to set up their own brushing profile. A number of pre-defined brushing profiles may be defined based, for example, on the age of the user, the user's dental history, or the preferences of the user (e.g. normal or soft brushing). Each of these profiles has predefined brushing parameters.

If the user wishes to use a predefined brushing profile, then in step 106 the predefined profile is selected. If on the other hand the user wishes to enter their own brushing parameters, then in step 108 the user enters their own brushing parameters. The brushing parameters may include: the timings $T_i$ for which each area of the mouth is to be brushed; the speed $S_i$ at which each area of the mouth is to be brushed; the maximum pressure $P_i$ at which each area of the mouth is to be brushed; and the maximum brushing dynamics $D_i$ for each area of the mouth (where for four quadrants i=1 . . . 4). These parameters may be the same or different for each area. In addition, the total brushing time $T_T$ may be set. The value of $T_T$ may be the sum of the individual timings $T_i$ for each area, or some other value.

In step 110 the application running on the mobile device sends the brushing parameters to the toothbrush device via Bluetooth. In step 112 the brushing parameters are stored in memory 32. The brushing parameters are then available to the control unit 46.

The above process may be repeated for different users, so that different brushing profiles are available for different users of the toothbrush.

Control Module

The control module 46 is operable to control operation of the motor 16 based on brushing parameters stored in the memory 32. In addition, some brushing parameters, such as initial brushing speed, may be set by the user using the button 25 on the toothbrush.

In a preferred embodiment of the invention, the control module 46 is also arranged to control vibration of the motor 16 in dependence on one or more of the orientation signal O, the brushing dynamics D and the pressure signal P. Broadly, control of the vibration of the motor is for one of two purposes: firstly, to provide feedback to the user to guide their brushing; and secondly to adapt the speed of vibration to suit the user's brushing technique, personal preferences or dental history.

For example, the ability to determine exactly where the user has brushed, and not just how long the user has brushed allows the device to adjust the vibration timings more intelligently. For example, if a user changes sides randomly, the device can still notify the user that a side has been brushed for the required 30 seconds, even though the 30 seconds might be reached at any point since the start of the brush.

The device can also let users set their own personalised brushing patterns, for instance: brush each quadrant for 15 seconds at a time, repeating the process twice; or brush each quadrant for 10 seconds at a time, repeating the process thrice. These different settings mean that the brush vibration will occur at different times when measured solely using time brushed.

The device can also adjust the speed of vibration in dependence on where the user is brushing. It may be desirable to brush certain areas of the mouth at different speeds from other areas. For example, gums should normally be brushed less hard than teeth. Thus, the device may be programmed to brush areas of the mouth with sensitive gums, or areas where the user is prone to over-brushing, at a lower speed than other areas.

The control module may also be programmed to stop or slow down vibration if the user is brushing too long in one area, and/or to stop or slow down vibration if the user starts brushing one area without completing another.

The control module 46 may also control the speed of the motor based on the brushing dynamics D received from the filtering module 40. For example, the control module may slow down or stop vibration if it is determined that the user is brushing too fast (moving through the mouth too quickly).

In addition, the control module 44 may control the speed of the motor based on the pressure signal P received from the pressure detector 48. For example, the control module may slow down or stop vibration if it is determined that the user is brushing too hard. Alternatively, the speed of vibration may be set based on based on a value indicating how much pressure is being applied. For example, the speed of vibration may be reduced as an increasing pressure is applied. This may help to ensure that the user does not over-brush their teeth, and thus may help to compensate for deficiencies in the user's brushing technique.

Pressure Feedback

In a preferred embodiment of the invention, the toothbrush system is arranged to provide feedback to the user regarding how much pressure has been applied while brushing different parts of the mouth. This can be achieved by linking the orientation data with the pressure data. Pressure feedback can be provided in real time (during brushing) and/or after brushing. The toothbrush can be operated while connected to an external device such as a smartphone (online) or independently (offline).

Figure 11:
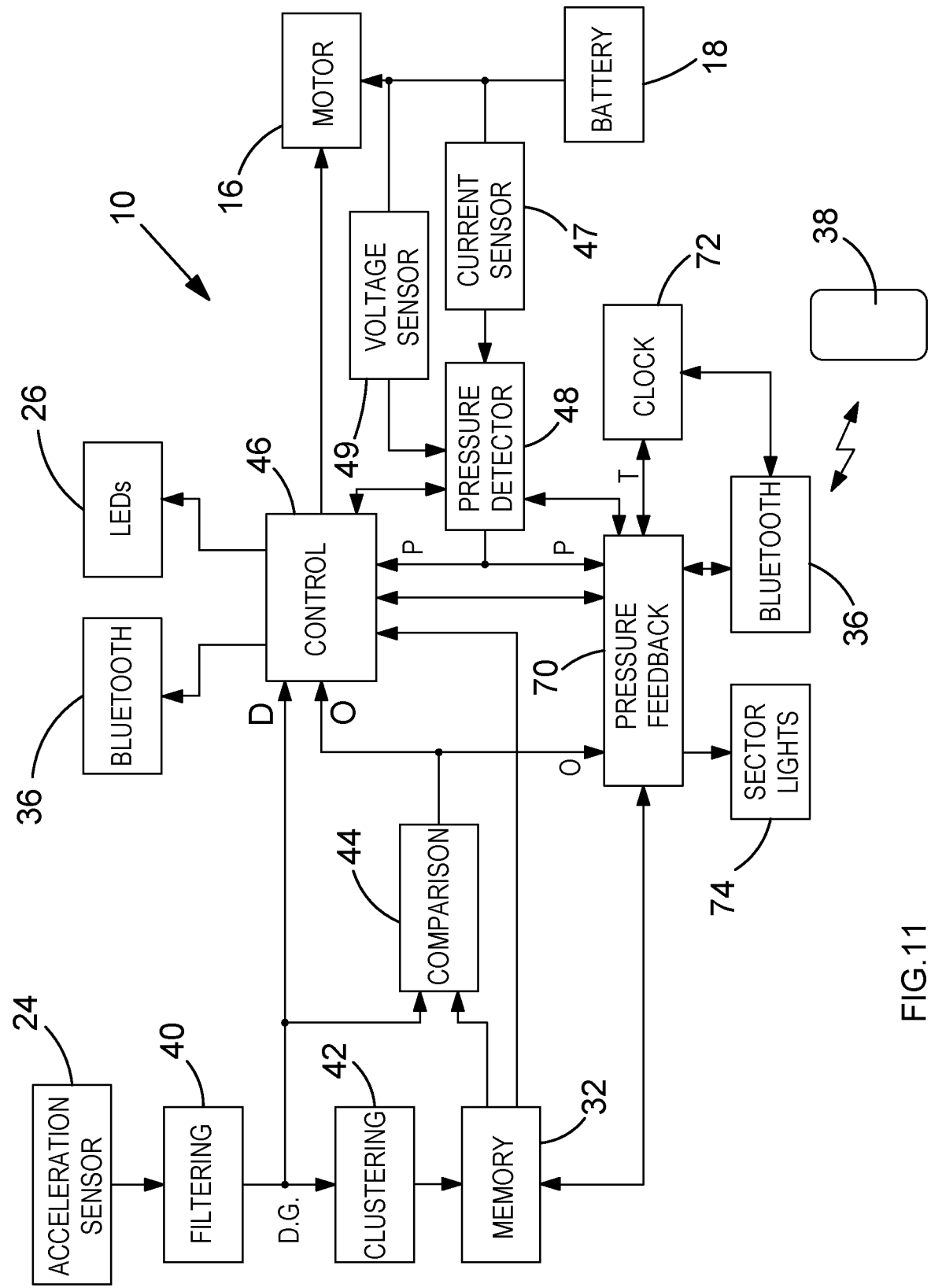
FIG. 11 shows parts of a toothbrush system in an embodiment of the invention.

FIG. 11 shows parts of a toothbrush system in an embodiment of the invention. Referring to FIG. 11, the system comprises toothbrush device 10 and mobile device 38. The toothbrush device comprises acceleration sensor 24, filtering module 40, clustering module 42, memory 32, comparison module 44, control module 46, current sensor 47, voltage sensor 49 and pressure detector 48 as well as motor 16 and battery 18. These parts may be the same as or similar to the corresponding parts described above with reference to FIGS. 2, 3 and 8, and accordingly are not described further.

The toothbrush device of FIG. 11 also includes pressure feedback module 70, clock module 72 and sector lights 74. The pressure feedback module 70 receives the orientation signal O from the comparison module 44, and the pressure signal P from the pressure detector 48. The pressure feedback module 70 also receives timing signals T from the clock module 72. The pressure feedback module 70 is connected to the control module 46, the memory 32 and to a Bluetooth module 36 (which may be the same as or similar to that described above). The pressure feedback module 70 is arranged to display pressure data on the sector lights 74 and/or transmit pressure data to the mobile device 38 via the Bluetooth module 36. The pressure feedback module 70 may be, for example, a software module executing on the microcontroller 30 of FIG. 2.

In operation, the pressure feedback module 70 receives successive values of the orientation signal O and the pressure signal P and processes those values in order to provide feedback to the user regarding the brushing pressure applied in different parts of the mouth. This feedback can be provided either in real time, or post brushing, or both.

In order to provide real time pressure feedback, the pressure feedback module 70 receives successive values of the orientation signal O and the pressure signal P at the same times and at successive time intervals (for example, at a rate of 20 Hz). For each time interval, the value of the pressure is compared to one or more pressure thresholds. This may be done as part of the pressure detection process described above and/or as part of a separate process carried out by the pressure detector. The pressure thresholds may be pre-stored standard thresholds or may be customised for a particular user. If desired, the thresholds may be dynamically variable, for example, depending on toothbrush orientation or brushing history.

In one embodiment, the pressure feedback module 70 outputs a desired threshold pressure to the pressure detector 48 (see step 156 of FIG. 9). The pressure detector 48 then calculates the pressure signal P using the steps described above with reference to FIG. 9. However, any of the other techniques described above for obtaining the pressure signal P may be used instead. In cases where the pressure signal is a variable, the pressure feedback module itself may compare the value of the pressure signal to one or more pressure thresholds for each time interval.

The value of the pressure signal is categorized into a pressure band in dependence on the result of the comparison. In the case of a single threshold, the pressure signal is a binary value indicating one of two pressure bands (e.g. "low" or "high"). However, if desired, the pressure could be compared to a plurality of different thresholds in order to classify the pressure into a plurality of different pressure bands (e.g. "low", "medium" or "high"). The pressure band at each time interval is then stored in the memory 32 together with the value of the orientation signal. Feedback is then given visually to the user regarding the pressure applied to that mouth section.

When connected to a mobile device, this feedback can be done via the device's screen. In this case, the Bluetooth module 36 is used to transmit the pressure band and the orientation signal (area of the mouth being brushed) to the mobile device 38. The mobile device may then process the data to provide the desired feedback. For example, a visual representation of the user's mouth may be used to show the pressure which is being applied to a particular area, for example by showing different pressures as different colours. Alternatively, a numerical representation of the pressure could be displayed, or text or icons could be used to indicate the pressure. It will be appreciated that the exact manner in which the data is presented may be varied as appropriate.

When brushing without being connected to an external device, pressure feedback can be achieved using the sector lights 74 on the toothbrush, each of which corresponds to a different part of the mouth. For example, the relevant sector light (selected based on the value of the orientation signal) could be lit when the pressure corresponding to that sector exceeds a threshold. Alternatively, a "traffic light" system could be used, whereby a particular sector light is displayed with a particular colour, such as red, amber or green, in dependence on the pressure corresponding to that sector.

In the case of post brushing feedback, values of the orientation signal O and the pressure signal P are received and stored for a complete brushing session. The brushing session is given a time stamp (date and time) by the clock module 72. The brushing session is then divided into a plurality of brushing time units (for example, 50 ms, 500 m, 1 s, etc.). Each time unit is labelled with the values of the orientation signal O and the pressure signal P at that point in time. The labelled time units are stored in the memory 32. With this approach, the pressure and orientation time units can be the same (for easier processing) or they may differ. In cases where they differ, the pressure and orientation units are subsequently normalized so the user can receive accurate feedback about their brushing.

Feedback may be provided on the screen of the mobile device 38, for example, by producing a "pressure map" indicating the average pressure which has been applied to different parts of the mouth during brushing. Alternatively, feedback can be provided using the sector lights 74 on the toothbrush. In this case, different colours on the sector lights can be used to show different pressure thresholds. It will be appreciated that other ways of presenting the relevant data, such as a numerical display, could be used instead.

If desired, multiple brushing sessions can be aggregated over a full brush session or multiple brush sessions. This can allow a pressure map of the mouth to be provided after a brush session or over a specified period of time, for example, a day, week, month etc.

Figure 12:
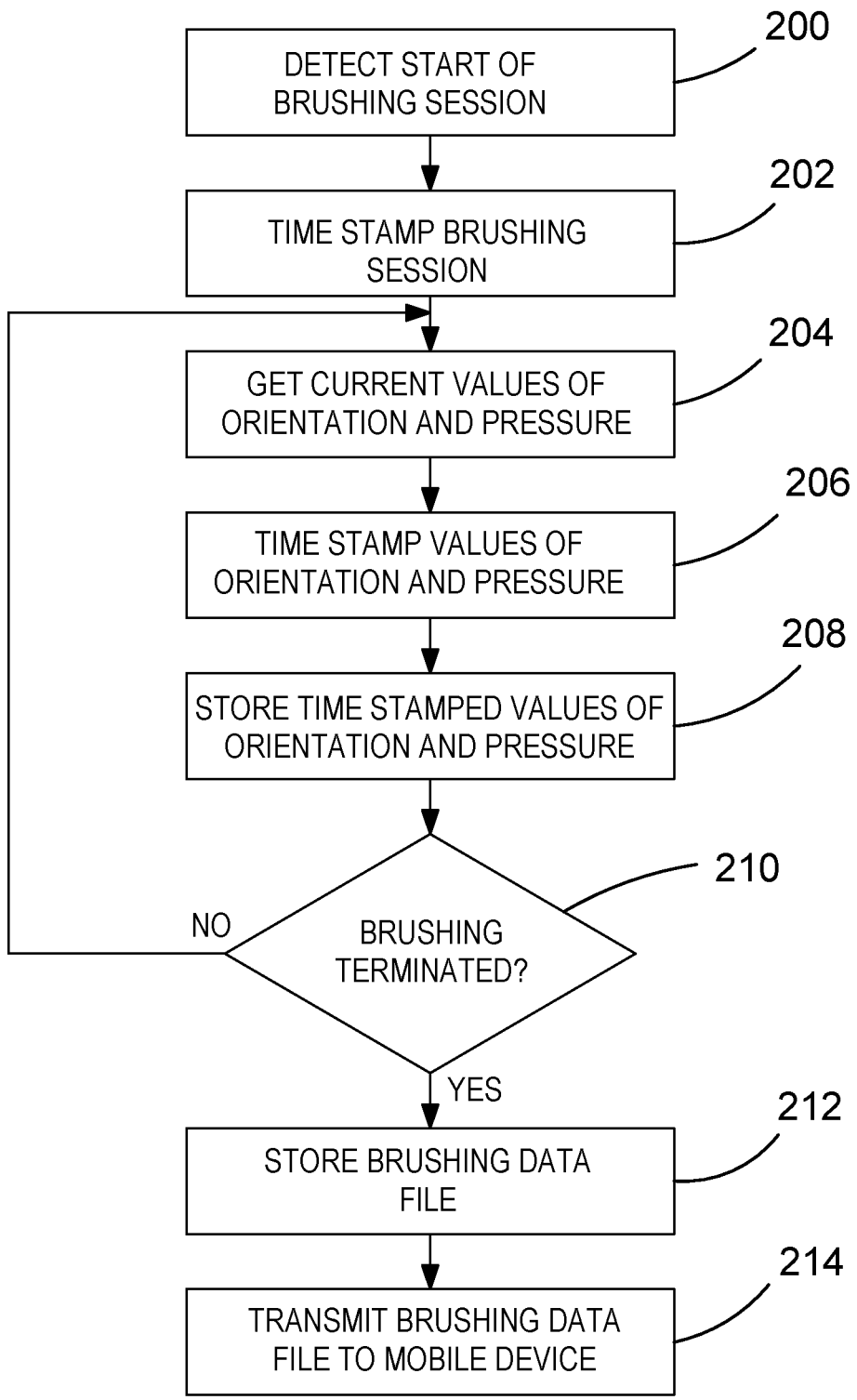
FIG. 12 shows steps carried out by a pressure feedback module to acquire pressure feedback data.

FIG. 12 shows steps carried out by the pressure feedback module 70 in one embodiment in order to acquire pressure feedback data. Referring to FIG. 12, in step 200 the pressure feedback module detects the start of a brushing session. This may be done based on a signal from the control module 46 to start the motor 16, and/or based on brushing dynamics D from the filtering module 40. In step 202 the pressure feedback module time stamps the brushing session with the date and time based on the timing signal T received from the clock module 72. In step 204 the pressure feedback module receives the current value of the orientation signal O from the comparison module 44 and the current value of the pressure signal P from the pressure detector 48. In step 206 the pressure feedback module 70 time stamps the current values of the orientation and pressure signals with a timing received from the clock module 72. This time stamp may be either an absolute value, or an offset from the start of the brushing session. In step 208 the pressure feedback module stores the time stamped values of the orientation and pressure signals in the memory 32. In step 210 the pressure feedback module determines whether the brushing session has terminated. This may be done based on an end of session signal from the control module 46, and/or based on brushing dynamics D from the filtering module 40. If the brushing session has not terminated, then processing returns to step 204, and the pressure feedback module receives the next values of the orientation signal O and the pressure signal P. If the brushing session has terminated, then in step 212 the pressure feedback module stores the complete set of orientation values, pressure values and time stamps in a brushing data file in the memory 32. In step 214 the pressure feedback module transmits the brushing data file to the mobile device 38 via the Bluetooth module 36.

Figure 13:
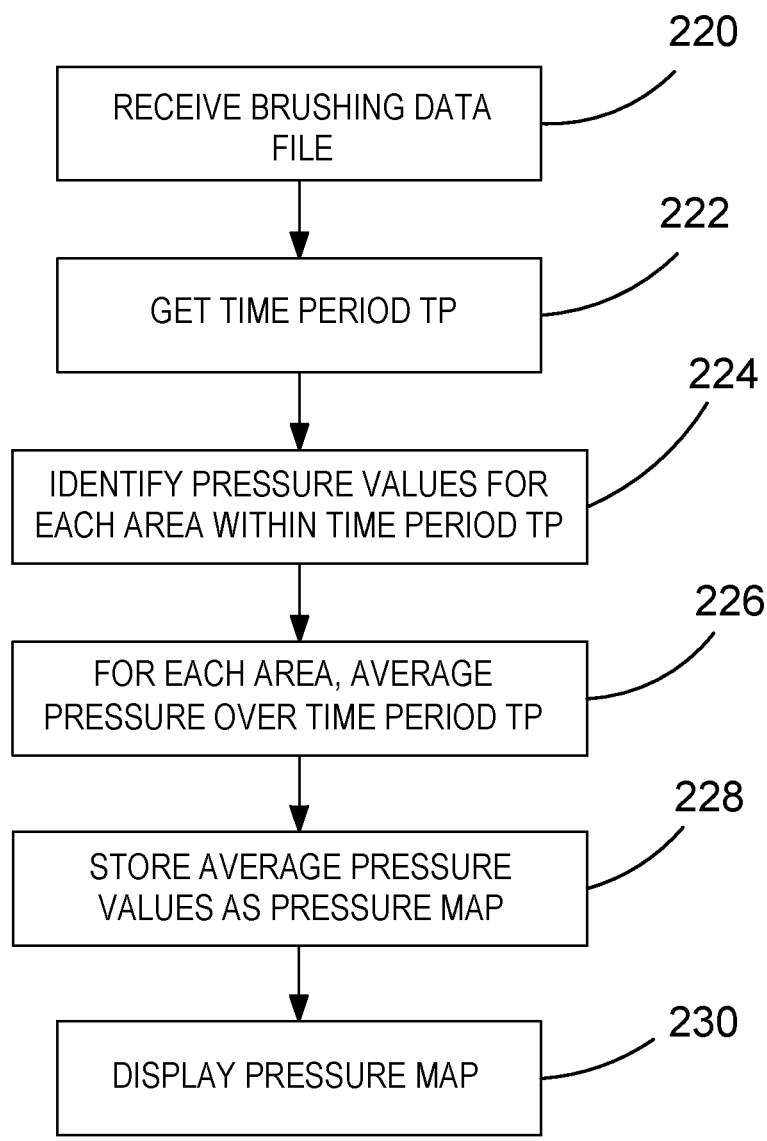
FIG. 13 shows steps carried out by a mobile device to display pressure data.

FIG. 13 shows steps carried out by the mobile device 38 in order to display pressure data. In this embodiment, the mobile device includes an application which runs on the device in order to carry out the appropriate steps. In step 220 the mobile device receives a brushing data file from the toothbrush device, transmitted via the Bluetooth module 36.

In step 222 the mobile device obtains a time period TP over which a brushing pressure map is to be produced. The time period TP may correspond to, for example, part of a brushing session, a whole brushing session, or multiple brushing sessions. The time period TP may be entered by a user, or may be prestored in the device, or may be produced automatically by the application running on the device. In step 224 the mobile device identifies the pressure values for each area of the mouth within the time period TP, based on the values of the orientation signal O and the timing signal T associated with each pressure value. In step 226 the mobile device produces an average value of pressure for each area of the mouth over the time period TP. In step 228 the mobile device stores the average value of pressure for each area of the mouth over the time period TP in memory as a brushing pressure map. In step 230 the mobile device displays the brushing pressure map on the screen of the device.

Figure 14:
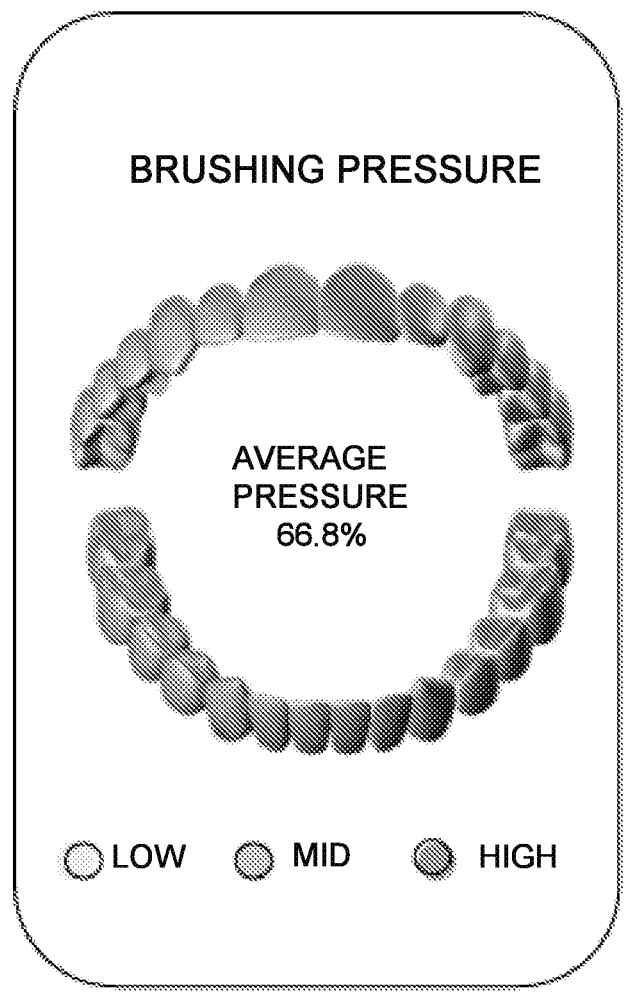
FIG. 14 shows an example of a brushing pressure map on the screen of a mobile device.

FIG. 14 shows an example of a brushing pressure map shown on the screen of the mobile device. Referring to FIG. 14, the screen is used to show a representation of the teeth in the user's mouth. Each of the teeth is displayed in a particular colour, with the colour representing a particular range of brushing pressures. The screen may also be used to display the average brushing pressure during a brushing session, the time period TP over which the map has been produced, and any other relevant data.

As an alternative, the screen could be used to show the evolution of brushing pressure over time for each area of the mouth using an animated display.

The pressure feedback module 70 on the toothbrush device may also be arranged to produce a pressure map, in a similar way to that described above with reference to FIG. 13. In this case, the brushing pressure map may be displayed on sector lights 74 on the toothbrush device itself. For example, each sector light may display a colour which depends on the average value of the brushing pressure for that sector over a particular time period, such as during a brushing session.

Figure 15:
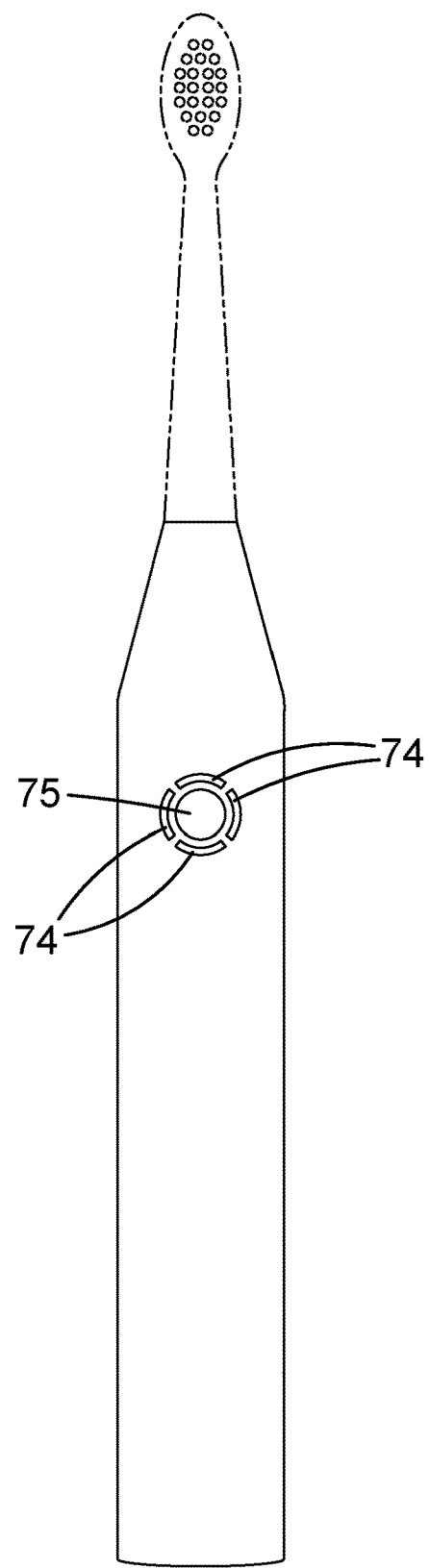
FIG. 15 shows an example of an electric toothbrush with a plurality of sector lights.

FIG. 15 shows an example of an electric toothbrush with a plurality of sector lights. Referring to FIG. 15, in this embodiment toothbrush device comprises four sector lights 74 spaced about a button 75. The button may be used to turn the device on and off and/or to adjust the settings. The sector lights are LEDs, each of which represents a different sector of the mouth. The sector lights are able to display different colours in order to represent different pressures.

In the arrangement described above, the brushing orientation and pressure values are stored together with the time at which the values were measured, using the timing signal T from the clock module 72. In this case, the processed values of position and pressure can be stored, or the raw values stored to be processed at a later date.

To accurately store orientation and pressure to provide the pressure map, the timestamp must be reliably synchronised and offset with an external clock when brushing independently of an external device. The clock 72 in the toothbrush device can synchronise its time from a reference source when it is online (for example, connected to a smartphone/tablet). The subsequent relative clock offsets are then measured using the clock on the device. This allows the toothbrush device to correctly timestamp the brushing times when the device is used offline.

If the battery in the toothbrush device has been completely drained of power, this will cause the clock to go out of sync. In this case, the toothbrush device logs the amount of time since last boot (since it has been charged back up), and the out-of-sync times can be corrected when the device goes back online.

In the arrangements described above, the values of the orientation signal O and the pressure signal P are linked together by time stamping the values. This enables pressure maps to be produced showing average pressure for each area of the mouth over various different time periods, such as part of a brushing session, a whole brushing session, or multiple brushing sessions. Furthermore, the amount of time for which too much pressure was applied can be determined and fed back to the user to assist them in correcting their brushing technique. In addition, the evolution of brushing pressure over time may be displayed.

In an alternative arrangement, the brushing orientation and pressure values are coupled together in discrete units such as "LH" "LM" "LL" etc indicating "Left High", "Left Medium", "Left Low" for direction and pressure, without linking them to time stamps. This may reduce the amount of data that needs to be stored and/or transmitted and/or simplify the processing, at the cost of losing some functionality.

In the above description, preferred features of the invention have been described with reference to various embodiments. However, it will be appreciated that the invention is not limited to these embodiments, and variations in detail may be made within the scope of the appended claims. For example, rather than using motor current to produce the pressure signal, a pressure switch or a pressure sensor could be used instead. Other modifications in detail will be apparent to the skilled person.

The invention claimed is:

1. An electric toothbrushing device comprising:
a vibration unit arranged to produce vibration of a toothbrush head;
an orientation unit arranged to produce an orientation signal indicating an area of a mouth being brushed;
a pressure determining unit arranged to produce a pressure signal indicating a pressure applied to the toothbrush head;
a clock arranged to produce a timing signal;
a battery arranged to supply power to the vibration unit;
a current sensor arranged to sense a current drawn from the battery by the vibration unit; and
a processor arranged to receive the orientation signal, the pressure signal and the timing signal, and to link values of the orientation signal with values of the pressure signal based on the timing signal by applying a time stamp to each of the values of the orientation signal and the values of the pressure signal in order to provide feedback to a user regarding a brushing pressure applied to each of a plurality of different areas of the mouth,
wherein the pressure determining unit is arranged to compare the sensed current to one or more current threshold values and to produce the pressure signal based on a result of the comparison,
wherein the pressure determining unit is arranged to perform a calibration process to determine at least one of the one or more current threshold values and store the at least one of the one or more current threshold values in memory, and
wherein the processor is arranged to associate a time stamp with successive values of the orientation signal and the pressure signal, and to store the successive values of the orientation signal and the pressure signal together with their time stamps in the memory.

2. The device of claim 1, wherein the processor is arranged to provide the feedback to the user regarding the brushing pressure based on the linked values of the pressure signal and the orientation signal.

3. The device of claim 1, the device further comprising a plurality of sector lights, wherein the processor is arranged to provide the feedback to the user regarding the brushing pressure applied to the plurality of different areas of the mouth using the plurality of sector lights.

4. The device of claim 1, the device further comprising a transmission module, wherein the transmission module is arranged to transmit the linked values of the pressure signal and the orientation signal to an external device.

5. The device of claim 1, wherein the processor is arranged to couple together values of the pressure signal and the orientation signal which occur in a same time interval.

6. The device of claim 1, wherein the processor is arranged to produce a pressure map indicating average pressure applied to different areas of the mouth over a predetermined period of time.

7. The device of claim 1, wherein the pressure determining unit is arranged to map a sensed current value to a pressure value.

8. The device of claim 1, further comprising a voltage sensor arranged to sense a battery voltage, wherein the pressure determining unit is further arranged to produce the pressure signal in dependence on the sensed battery voltage.

9. The device of claim 8, wherein the one or more current threshold values are adjusted based on the sensed battery voltage.

10. The device of claim 8, wherein the pressure determining unit is arranged to perform the calibration process and determine the at least one of the one or more current threshold values in dependence on the sensed battery voltage.

11. The device of claim 1, wherein the processor is arranged to adjust the vibration produced by the vibration unit in dependence on the pressure signal.

12. The device of claim 1, the orientation unit further comprising a motion sensor arranged to sense motion of the device to produce motion data, wherein the processor is arranged to analyse the motion data to produce the orientation signal.

13. The device of claim 12, wherein the processor is arranged to:
produce, from the motion data, estimates of brushing dynamics and estimates of average acceleration; and
produce an indication of an area of the mouth being brushed based on the estimates of brushing dynamics and the estimates of average acceleration.

14. The device of claim 13, wherein the processor is further arranged to:
perform a clustering process on the estimates of brushing dynamics and the estimates of average acceleration to produce clustering results, the clustering results comprising a plurality of clusters each of which represents a brushing area;
store the clustering results in the memory; and
compare subsequent estimates of brushing dynamics and subsequent estimates of average acceleration with the stored clustering results, thereby to yield the indication of the area of the mouth being brushed.

15. The device of claim 1, wherein the pressure determining unit is arranged to calculate dynamically the at least one of the one or more current threshold values for a given brushing pressure as a result of the calibration process.

16. A toothbrush system comprising an electric toothbrush device and an external processing device, wherein:
the electric toothbrush device comprises:
a vibration unit arranged to produce vibration of a toothbrush head;
an orientation unit arranged to produce an orientation signal indicating an area of a mouth being brushed;
a pressure determining unit arranged to produce a pressure signal indicating a pressure applied to the toothbrush head;
a clock arranged to produce a timing signal;
a battery arranged to supply power to the vibration unit;
a current sensor arranged to sense a current drawn from the battery by the vibration unit;
a processor arranged to receive the orientation signal, the pressure signal and the timing signal, and to link values of the orientation signal with values of the pressure signal based on the timing signal by applying a time stamp to each of the values of the orientation signal and the values of the pressure signal in order to provide feedback to a user regarding a brushing pressure applied to each of a plurality of different areas of the mouth,
wherein the pressure determining unit is arranged to compare the sensed current to one or more current threshold values and to produce the pressure signal based on a result of the comparison,
wherein the pressure determining unit is arranged to perform a calibration process to determine at least one of the one or more current threshold values and store the at least one of the one or more current threshold values in memory, and
wherein the processor is arranged to associate a time stamp with successive values of the orientation signal and the pressure signal, and to store the successive values of the orientation signal and the pressure signal together with their time stamps in the memory; and
a transmission module arranged to transmit the linked values of the pressure signal and the orientation signal to the external processing device; and
the external processing device is arranged to receive the linked values of the pressure signal and the orientation signal from the electric toothbrush device and to display a pressure map indicating average pressure over a predetermined period of time for each of the plurality of different areas of the mouth.

17. The toothbrush system of claim 16, wherein the predetermined period of time is input by the user.

18. A method of operating an electric toothbrushing device, the method comprising:
producing vibration of a toothbrush head using a vibration unit;
producing an orientation signal indicating of an area of a mouth being brushed;
producing a pressure signal indicating a pressure applied to the toothbrush head;
producing a timing signal;
sensing a current drawn from a battery by the vibration unit;
comparing the sensed current to one or more current threshold values to produce the pressure signal based on a result of the comparison, wherein at least one of the one or more current threshold values are determined by a calibration process and stored in memory;
linking values of the orientation signal with values of the pressure signal based on the timing signal by applying a time stamp to each of the values of the orientation signal and the values of the pressure signal, wherein a time stamp is associated with successive values of the orientation signal and the pressure signal, and the successive values of the orientation signal and the pressure signal are stored together with their time stamps in the memory; and providing feedback to a user regarding a brushing pressure applied to each of a plurality of different areas of the mouth based on the linked values of the orientation and pressure signals.

19. The method of claim 18, wherein providing the feedback to the user comprises displaying a pressure map indicating average pressure over a predetermined period of time for each of the plurality of different areas of the mouth.

20. The method of claim 19, wherein the predetermined period of time is input by the user.

\* \* \* \* \*